United States Patent
Lührmann et al.

(10) Patent No.: US 11,378,863 B1
(45) Date of Patent: Jul. 5, 2022

(54) NONLINEAR FREQUENCY CONVERSION WITH VARIABLE AVERAGE POWER AND STABLE HEAT LOAD

(71) Applicant: Coherent Kaiserslautern GmbH, Kaiserslautern (DE)

(72) Inventors: Markus Lührmann, Kaiserslautern (DE); Christoph O. Schäfer, Dellfeld (DE); Stefan Niedlich, Kaiserslautern (DE); Ralf Knappe, Trippstadt (DE)

(73) Assignee: Coherent Kaiserslautern GmbH, Kaiserslautern (DE)

( * ) Notice: Subject to any disclaimer, the term of this patent is extended or adjusted under 35 U.S.C. 154(b) by 0 days.

(21) Appl. No.: 17/231,919

(22) Filed: Apr. 15, 2021

(51) Int. Cl.
   *G02F 1/35* (2006.01)
   *G02F 1/37* (2006.01)
   *G02F 1/11* (2006.01)

(52) U.S. Cl.
   CPC ............... *G02F 1/354* (2021.01); *G02F 1/11* (2013.01); *G02F 1/37* (2013.01); *G02F 1/3503* (2021.01)

(58) Field of Classification Search
   CPC .......... G02F 1/3503; G02F 1/354; G02F 1/37; G02F 1/11
   See application file for complete search history.

(56) References Cited

U.S. PATENT DOCUMENTS

| 3,665,204 | A | * | 5/1972 | Nelson | ...................... | G02F 1/37 |
| | | | | | | 359/285 |
| 5,093,832 | A | * | 3/1992 | Bethune | .................... | G02F 1/37 |
| | | | | | | 372/21 |
| 7,242,700 | B2 | | 7/2007 | Wang | | |
| 2017/0023843 | A1 | | 1/2017 | Seifert | | |
| 2018/0254603 | A1 | * | 9/2018 | Patel | ...................... | H01S 5/141 |

FOREIGN PATENT DOCUMENTS

WO   WO-2017012898 A1 * 1/2017 ............... G02F 1/31

\* cited by examiner

*Primary Examiner* — Daniel Petkovsek
(74) *Attorney, Agent, or Firm* — Morrison & Foerster LLP

(57) ABSTRACT

A system for nonlinear frequency conversion includes an acousto-optic modulator for diffracting a portion of an input laser beam as a first-order beam and transmitting a non-diffracted portion of the input laser beam as a zeroth-order beam. The system also includes a nonlinear crystal arranged to receive and frequency convert each of the zeroth-order and first-order beams to generate two respective frequency-converted laser beams, whereby, when the acousto-optic modulator changes the average-power ratio between the zeroth-order and first-order beams, variations of the heat load in the nonlinear crystal are minimized. Either one of the two frequency-converted laser beams may be used as an output laser beam of the system, while the other one of the two frequency-converted laser beams serves to stabilize the heat load in the nonlinear crystal when the acousto-optic modulator is operated to change the average power in the output laser beam.

27 Claims, 10 Drawing Sheets

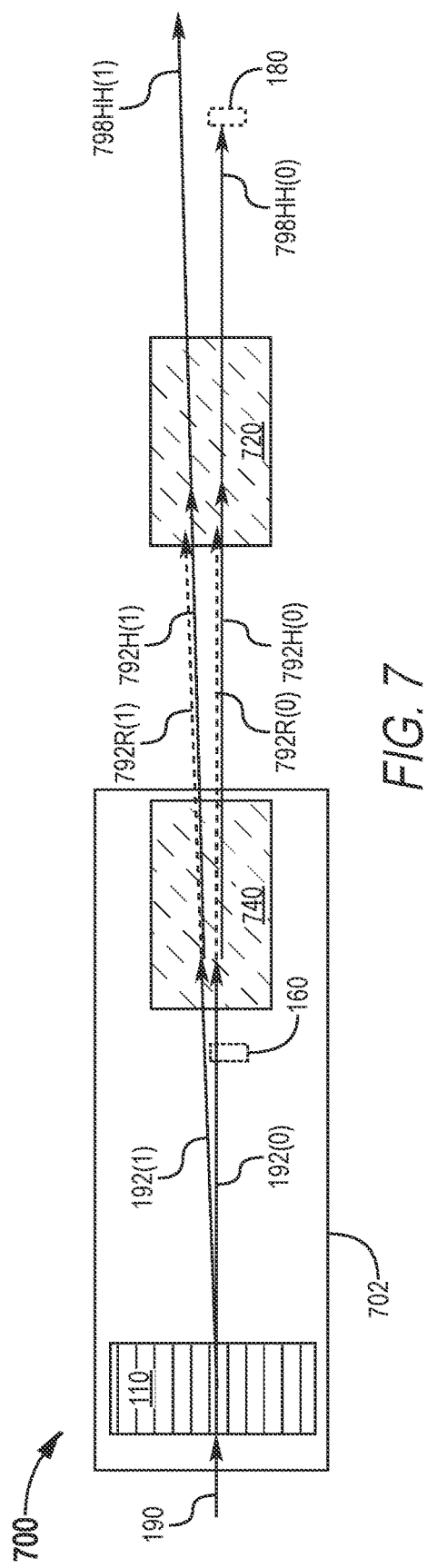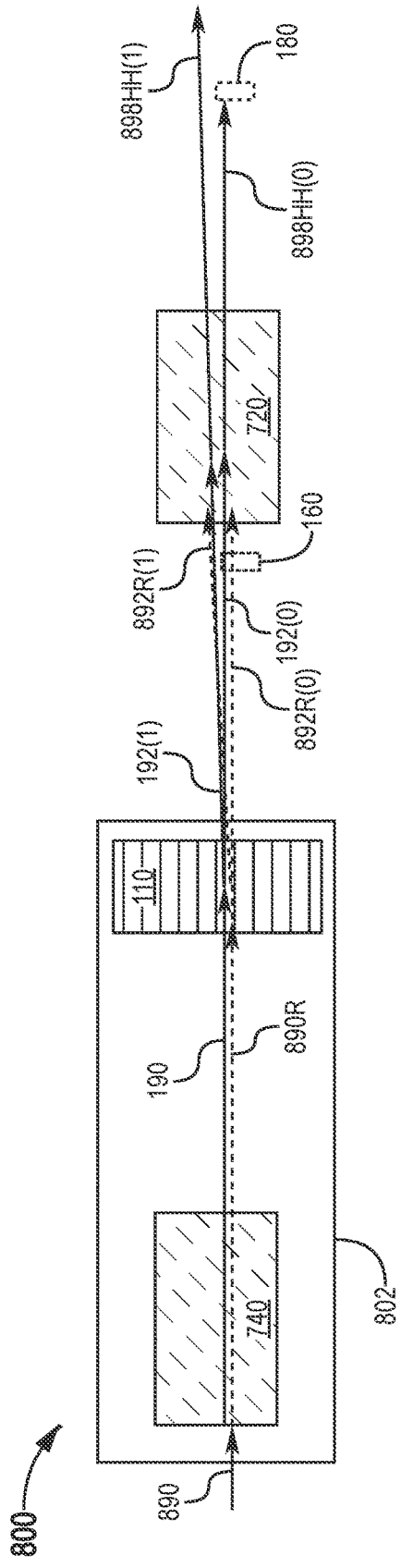

NONLINEAR FREQUENCY CONVERSION WITH VARIABLE AVERAGE POWER AND STABLE HEAT LOAD

TECHNICAL FIELD OF THE INVENTION

The present invention relates in general to frequency conversion in nonlinear crystals with power modulation of the frequency-converted output laser beam, in particular to techniques for managing heat load in the nonlinear crystals.

DISCUSSION OF BACKGROUND ART

Frequency conversion in a nonlinear crystal is a commonly used technique for transforming the wavelength of laser radiation. In many situations, when visible or ultraviolet laser radiation of high power is needed, the preferred approach is to first generate laser radiation in the near-infrared and then transform it to the visible or ultraviolet by frequency converting the near-infrared laser radiation. The primary reason for this approach is that several attractive solutions exist for generation of high-power laser radiation. For example, some of the more popular laser sources are based on lanthanoid-doped yttrium aluminum garnet (YAG) crystals. Lanthanoid-doped YAG crystals are efficient and reliable laser gain media for generation of laser radiation at several different near-infrared wavelengths, especially 1064 nanometers in the case of a neodymium-doped YAG crystal and 1030 nanometers in the case of an ytterbium-doped YAG crystal. Once generated by a near-infrared laser source, the near-infrared laser radiation is passed through a nonlinear crystal for harmonic generation to reach the visible, whereafter, if needed, further frequency conversion may take place in one or more additional nonlinear crystals to reach a desired wavelength. Such harmonic generation, and further frequency conversion when applicable, is particularly effective for pulsed laser radiation where high peak powers facilitate high conversion efficiency.

Efficient frequency conversion in a nonlinear crystal relies on the input laser beam (or beams) being phase matched with the frequency-converted laser beam, such that, as the input and frequency-converted laser beams propagate through the nonlinear crystal, frequency-converted laser radiation generated at each spatial location interferes constructively with frequency-converted laser radiation generated at preceding spatial locations. Depending on the wavelengths and the type of nonlinear crystal used, critical or non-critical phase matching may be used.

In non-critical phase matching, also known as "temperature phase matching", the nonlinear crystal is kept at a temperature where the refractive index is the same for the respective wavelengths of the input and frequency-converted laser beams, while these beams travel along an axis of the nonlinear crystal. Non-critical phase matching is only possible when such a temperature exists. Non-critical phase matching typically requires heating the nonlinear crystal to an elevated temperature.

Critical phase matching, also known as "angle phase matching", utilizes a birefringent nonlinear crystal and takes advantage of the polarization dependence of the refractive index of this birefringent nonlinear crystal. The angle of incidence of the input laser beam (or beams), relative to the crystal axes, is tuned such that the refractive index is the same for the input laser beam(s) and the frequency-converted laser beam. Critical phase matching is generally also temperature sensitive due to the temperature dependences of the refractive indices at the respective wavelengths and polarizations of the input and frequency-converted laser beams. Critical phase matching is typically accomplished without heating the nonlinear crystal to an elevated temperature but requires operating at a constant temperature with a specific incidence angle(s) of the input laser beam(s).

High-power pulsed laser beams are used in many different applications, including important industrial processes such as laser machining, laser welding, and laser annealing. The use of lasers to perform industrial materials processing is rapidly expanding as new processes are developed, existing processes are improved, and laser systems are developed, tailored, and/or optimized to perform these processes. Some processes require a visible or ultraviolet pulsed laser beam with a pulse energy of tens of microjoules, or more, with pulse-repetition rates resulting in an average power of tens or hundreds of watts, or more.

In both industrial materials processing and other applications, it is often necessary to vary the average power of the laser beam. In its simplest form, such power variation consists of switching the laser beam on and off. For example, in industrial materials processing, the laser beam may need to be repeatedly switched on and off to synchronize laser light exposure with other aspects of the process, e.g., mechanical movement of workpieces relative to the laser beam or scanning of the laser beam relative to the workpieces. However, the switching times required are often too fast for a mechanical shutter, and it is generally not feasible to repeatedly switch on and off the actual laser source. Within the context of visible or ultraviolet high-power pulsed laser beam generation based on frequency conversion of near-infrared laser radiation, the current state-of-the-art switching technique uses an acousto-optic or electro-optic modulator to switch the infrared laser beam on and off before frequency conversion. This technique benefits from relatively affordable acousto-optic and electro-optic modulators, with a high damage threshold, available in the near-infrared.

SUMMARY OF THE INVENTION

Disclosed herein are systems and methods for nonlinear frequency conversion of laser radiation that maintain a stable heat load in the nonlinear crystal while varying the average power of a frequency-converted output laser beam. These systems and methods overcome a heat-load problem afflicting existing systems that vary the average power of the input laser beam, or beams, before frequency conversion in a nonlinear crystal. When the frequency-converted laser beam and/or the input laser beam(s) have substantial average power within the nonlinear crystal, even low-level absorption of laser radiation by the nonlinear crystal may elevate the crystal temperature. As a result, when varying the average power of the input laser beam(s) prior to frequency conversion, especially into the ultraviolet, the conversion efficiency may suffer from degraded phase matching caused by crystal temperature changes. The presently disclosed systems and methods overcome this issue by acousto-optically switching an input laser beam between two diffractive orders and directing both diffractive orders to the nonlinear crystal for frequency conversion. The frequency-converted laser beam from one of the two diffractive orders is used as the frequency-converted output laser beam. Frequency conversion of the other diffractive order serves to stabilize the heat load in the nonlinear crystal when the acousto-optic modulator changes the average-power ratio between the two diffractive orders. The average power of the frequency-converted output laser beam is changed by switching power between the two diffractive orders and thereby changing this average-power ratio.

Due to most nonlinear crystals exhibiting relatively high absorption in the ultraviolet, the presently disclosed approach is particularly advantageous in generation of ultraviolet laser radiation by frequency conversion of visible or near-infrared laser radiation. The benefits of the present approach are, however, not limited to generation of ultraviolet laser radiation. Generally, the present approach may be advantageous in any form of nonlinear frequency conversion where (a) the average power of a frequency-converted laser beam needs to be varied, e.g., switched on and off, and (b) one or more of the laser beams involved in the frequency conversion process has sufficient average power to produce a significant heat load in the nonlinear crystal. For example, the present approach may be advantageous in frequency conversion into the mid-infrared or for frequency conversion of high-power laser beams in or into the visible.

In one aspect, a system for nonlinear frequency conversion includes an acousto-optic modulator for diffracting a portion of an input laser beam as a first-order beam and transmitting a non-diffracted portion of the input laser beam as a zeroth-order beam. The system further includes a nonlinear crystal arranged to receive and frequency convert each of the zeroth-order and first-order beams to generate two respective frequency-converted laser beams, whereby, when the acousto-optic modulator changes the average-power ratio between the zeroth-order and first-order beams, variations of the heat load in the nonlinear crystal are minimized.

In another aspect, a method for nonlinear frequency conversion includes modulating an input laser beam with an acousto-optic modulator to diffract a portion of the input laser beam as a first-order beam and transmit a non-diffracted portion of the input laser beam as a zeroth-order beam. The method further includes controlling the acousto-optic modulator to transfer average power between the zeroth-order and first-order beams, and frequency converting the zeroth-order and first-order beams in a nonlinear crystal to generate two respective frequency-converted laser beams, whereby, when the acousto-optic modulator changes the average-power ratio between the zeroth-order and first-order beams, variations of the heat load in the nonlinear crystal are minimized.

In a further aspect, a fourth-harmonic laser apparatus includes a second-harmonic generator for generating two second-harmonic laser beams from a fundamental-frequency laser beam. The second-harmonic generator includes a first frequency-doubling crystal for frequency doubling laser radiation incident thereon, and an acousto-optic modulator for generating zeroth and first diffractive orders of laser beams incident thereon. The acousto-optic modulator is arranged to control an average-power ratio between the two second-harmonic laser beams. The apparatus further includes a second frequency-doubling crystal arranged to receive and frequency double each of the two second-harmonic laser beams to generate two respective fourth-harmonic laser beams, whereby, when the acousto-optic modulator changes the average-power ratio between the two second-harmonic laser beams, variations of the heat load in the second frequency-doubling crystal are minimized.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIG. 7 illustrates a system for two-stage harmonic generation preceded by acousto-optic modulation for variation of the average power of the frequency-converted output laser beam, according to an embodiment. This system is capable of maintaining a stable heat load in the second nonlinear crystal while varying the average power of a frequency-converted output laser beam.

FIG. 8 illustrates a system for two-stage harmonic generation with inter-stage acousto-optic modulation for variation of the average power of the frequency-converted output laser beam, according to an embodiment. This system is capable of maintaining a stable heat load in the second nonlinear crystal while varying the average power of a frequency-converted output laser beam.

DETAILED DESCRIPTION OF THE INVENTION

Figure 1:
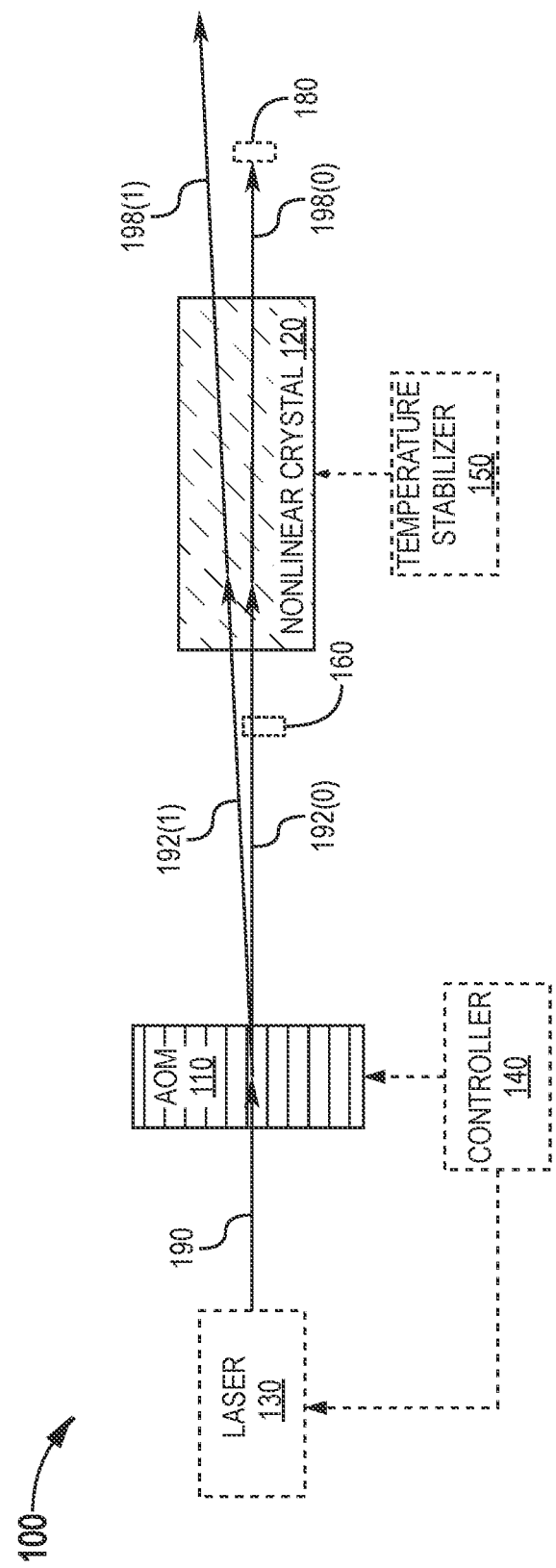
FIG. 1 illustrates a system for nonlinear frequency conversion of a laser beam in a nonlinear crystal, according to an embodiment. This system is capable of maintaining a stable heat load in the nonlinear crystal while varying the average power of a frequency-converted output laser beam.

Referring now to the drawings, wherein like components are designated by like numerals, FIG. 1 illustrates one system 100 for nonlinear frequency conversion of a laser beam 190 in a nonlinear crystal 120. System 100 is capable of maintaining a stable heat load in nonlinear crystal 120 while varying the average power of a frequency-converted output laser beam. In addition to nonlinear crystal 120, system 100 includes an acousto-optic modulator (AOM) 110 positioned in the path of laser beam 190 prior to nonlinear crystal 120. System 100 may further include a laser 130 that generates laser beam 190. Laser beam 190 may be pulsed or continuous-wave.

When actively modulating, AOM 110 diffracts a portion of laser beam 190 into a first diffractive order to produce a first-order beam 192(1). A non-diffracted portion of laser beam 190 is transmitted by AOM 110 in a zeroth diffractive order to form a zeroth-order beam 192(0). AOM 110 may also diffract some of laser beam 190 into higher-order diffractive orders, for example a second diffractive order.

Nonlinear crystal 120 converts the frequency of both zeroth-order beam 192(0) and first-order beam 192(1) to generate respective frequency-converted beams 198(0) and 198(1). In one embodiment, the frequency conversion performed by nonlinear crystal 120 is harmonic generation, for example second harmonic generation. In another embodiment, each of zeroth-order beam 192(0) and first-order beam 192(1) mixes with one or more additional laser beams in nonlinear crystal 120 to generate frequency-converted beams 198(0) and 198(1) by sum-frequency mixing or difference-frequency mixing.

Either one of frequency-converted beams 198(0) and 198(1) may be used as a frequency-converted output laser beam and directed to a target, such as a workpiece, a sample, or another optical element or system. System 100 may include a controller 140 that controls AOM 110 to set a desired average-power ratio between zeroth-order beam 192(0) and first-order beam 192(1), so as to generate the frequency-converted output laser beam with a desired average power. In one example, controller 140 regulates radio-frequency (RF) electrical power supplied by an RF generator to an acoustic transducer of AOM 110 that is bonded to a crystal of AOM 110.

In one use scenario, frequency-converted beam 198(1) is used as a frequency-converted output laser beam that is directed to a target. In this scenario, the presence of zeroth-order beam 192(0) and frequency-converted beam 198(0) in nonlinear crystal 120 serves to stabilize the heat-load in nonlinear crystal 120 when AOM 110 changes the average power of frequency-converted beam 198(1) by changing the average-power ratio between zeroth-order beam 192(0) and first-order beam 192(1). A beam-dump 180 may block frequency-converted beam 198(0). Alternatively, the roles are interchanged such that frequency-converted beam 198(0) is used as a frequency-converted output laser beam, while the presence of first-order beam 192(1) and frequency-converted beam 198(1) in nonlinear crystal 120 serves to stabilize the heat-load in nonlinear crystal 120. In this use scenario, beam-dump 180 may be positioned to block frequency-converted beam 198(1).

Absorption of any one of zeroth-order beam 192(0), first-order beam 192(1), frequency-converted beam 198(0), and frequency-converted beam 198(1) results in a heat load in nonlinear crystal 120. For many commonly used nonlinear crystals (especially those used for ultraviolet generation), such as beta barium borate (BBO), lithium triborate (LBO), caesium lithium triborate (CLBO), and lithium tetraborate (LTB), the absorption is relatively small throughout the near-infrared and visible, but becomes substantial above some wavelength in the ultraviolet. Therefore, system 100 is particularly advantageous when at least some of zeroth-order beam 192(0), first-order beam 192(1), frequency-converted beam 198(0), and frequency-converted beam 198(1) are ultraviolet.

In one embodiment, nonlinear crystal 120 is a doubling crystal, zeroth-order beam 192(0) and first-order beam 192(1) are visible, and frequency-converted beams 198(0) and 198(1) are ultraviolet. In one example of this embodiment, laser 130 is a frequency doubled neodymium-doped yttrium aluminum garnet (Nd:YAG) laser or a frequency doubled neodymium-doped yttrium orthovanadate (Nd:YVO$_4$) laser, such that laser beam 190 has a wavelength of 532 nanometers (nm) and frequency-converted beams 198(0) and 198(1) have a wavelength of 266 nm. In another example, the laser is frequency doubled ytterbium-doped YAG (Yb:YAG), such that laser beam 190 has a wavelength of 515 nanometers (nm) and frequency-converted beams 198(0) and 198(1) have a wavelength of 258 nm. In yet another example of this embodiment, laser 130 is an argon ion (or solid-state) laser that generates laser beam 190 with a wavelength of 488 nm, such that frequency-converted beams 198(0) and 198(1) have a wavelength of 244 nm.

In another embodiment, nonlinear crystal 120 is configured for sum-frequency mixing and at least frequency-converted beams 198(0) and 198(1) are ultraviolet. In yet another embodiment, nonlinear crystal 120 is configured for difference-frequency mixing and (a) zeroth-order beam 192(0) and first-order beam 192(1), and/or (b) frequency-converted beams 198(0) and 198(1) are ultraviolet. However, even in the visible, the absorption of many commonly used nonlinear crystals is sufficiently high that high-average-power visible laser radiation produces a substantial heat load. System 100 may therefore also be advantageous outside the ultraviolet when some of the involved laser beams are high-average-power visible or near-infrared laser beams, for example with average powers in the kilowatt range.

A conventional AOM is not capable of diffracting 100% of the average power. Typically, AOM 110 is therefore not capable of entirely switching off zeroth-order beam 192(0). AOM 110 may be capable of diffracting about 60-95% of the average power of laser beam 190 into first-order beam 192(1), while transmitting nearly all of the remaining average power of laser beam 190 into zeroth-order beam 192(0). Consequently, when the ability to entirely switch off the frequency-converted output laser beam is the objective, frequency-converted beam 198(1) may be the preferred output beam of system 100. In addition, the beam quality for first-order beam 192(1) can be maintained over the entire AOM modulation range and the beam parameters kept mostly constant, which is typically not the case for the zeroth-order beam 192(0). On the other hand, if maximizing the average power of the frequency-converted output laser beam is more important than being able to maintain mostly constant beam parameters and to reach zero average power, the preferred output beam of system 100 is typically frequency-converted beam 198(0). Furthermore, at least in the case of harmonic generation, the nonlinear frequency-conversion efficiency of nonlinear crystal 120 further suppresses of the power of frequency-converted beam 198(0) relative to the power of frequency-converted beam 198(1), when only a relatively small fraction of laser beam 190 is transmitted in zeroth-order beam 192(0).

Zeroth-order beam 192(0) is phase-matched to frequency-converted beam 198(0), and first-order beam 192(1) is phase-matched to frequency-converted beam 198(1). Whether the phase matching is critical or non-critical, the frequency conversion efficiency is sensitive to heat load in nonlinear crystal 120 from the input laser beams and the frequency-converted output laser beams. System 100 may include a temperature stabilizer 150 that stabilizes the temperature of nonlinear crystal 120 to the temperature required for non-critical phase matching or chosen for critical phase matching. Heat delivery to or heat extraction from nonlinear crystal 120 by temperature stabilizer 150 combines with the laser-induced heat load to achieve the phase-matching temperature.

In one embodiment, nonlinear crystal 120 is a birefringent crystal configured for critical phase matching. In this embodiment, the phase-matching angles of zeroth-order beam 192(0) and first-order beam 192(1), relative to the crystal axis or axes of nonlinear crystal 120, are sensitive to the temperature of nonlinear crystal and thus to the laser-induced heat load. Therefore, when operating with critical phase matching, the incidence angles of zeroth-order beam 192(0) and first-order beam 192(1), onto nonlinear crystal 120, are set according to a targeted value of the laser-induced heat load.

Especially when operating with critical phase matching, optimal performance of system 100 benefits from zeroth-order beam 192(0) and first-order beam 192(1) being equally phase matched in nonlinear crystal 120 to have equal frequency conversion efficiency. Since AOM 110 causes zeroth-order beam 192(0) and first-order beam 192(1) to be incident on nonlinear crystal 120 at slightly different angles (at least in the absence of correcting beam steering), equal phase matching of zeroth-order beam 192(0) and first-order beam 192(1) may require orienting nonlinear crystal 120 at an angle that is non-optimal, but equally so, for each of zeroth-order beam 192(0) and first-order beam 192(1). In one implementation using critical phase matching, nonlinear crystal 120 is a uniaxial crystal oriented with its optic axis coplanar with zeroth-order beam 192(0) and first-order beam 192(1), such that zeroth-order beam 192(0) and first-order beam 192(1) are phase matched to the same degree. System 100 may include a mechanism for setting the orientation of nonlinear crystal 120 relative to the propagation directions of zeroth-order beam 192(0) and first-order beam 192(1) so as to phase match zeroth-order beam 192(0) and first-order beam 192(1) to the same degree. This mechanism may also facilitate adjustable compensation for misalignment of zeroth-order beam 192(0) and first-order beam 192(1) through system 100. In one example, system 100 includes a stage configured to rotate nonlinear crystal 120. In another example, system 100 includes an optic, such as a dove prism, configured to rotate the image of zeroth-order beam 192(0) and first-order beam 192(1) incident on nonlinear crystal 120.

Figure 2:
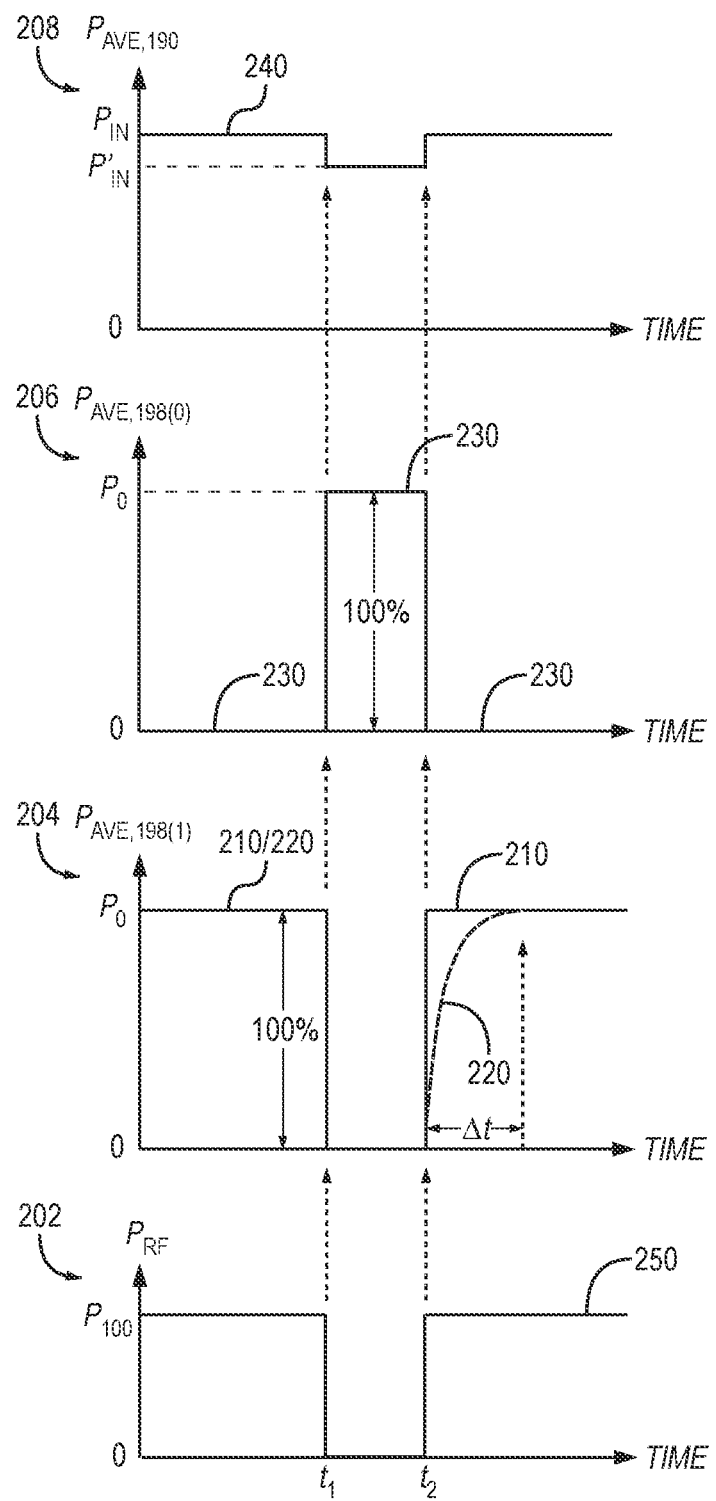
FIG. 2 compares the average-power output of the system of FIG. 1, in a 100% switching scenario, to that of a system that forwards only one diffractive order to frequency conversion.

FIG. 2 is a timing diagram comparing the average-power output of system 100, in a 100% switching scenario, to that of a system that forwards only one diffractive order to frequency conversion. In this scenario, frequency-converted beam 198(1) is used as the frequency-converted output laser beam and initially has an average power $P_0$, with nonlinear crystal 120 being at the optimum temperature for either critical or non-critical phase matching. FIG. 2 shows temporally synchronized diagrams 202, 204, 206, and 208. Diagram 202 plots the power $P_{RF}$ of a radio-frequency (RF) electrical signal supplied to AOM 110 by controller 140. Diagram 204 plots the average power $P_{AVE,198(1)}$ of frequency-converted beam 198(1). Diagram 206 plots the average power $P_{AVE,198(0)}$ of frequency-converted beam 198(0). Diagram 208 plots the average power $P_{AVE,190}$ of laser beam 190 in a scenario without ideal 100% switching.

It is the intention to switch off frequency-converted beam 198(1) at a time $t_1$ and then, at a time $t_2$, switch back on frequency-converted beam 198(1) at average power $P_0$. To carry out this 100% switching scenario, controller 140 drives AOM 110 with an RF power $P_{100}$ up to time $t_1$ (see curve 250 of diagram 202) such that AOM 110 diffracts all of laser beam 190 into first-order beam 192(1) up to time $t_1$. At time $t_1$, controller 140 turns off the RF electrical signal to switch all of laser beam 190 into the transmitted zeroth-order beam 192(0). At time $t_2$, controller 140 turns the RF electrical signal back on at $P_{100}$ to switch all of laser beam 190 back into diffracted first-order beam 192(1). This 100% switching scenario assumes an "ideal" AOM capable of diffracting 100% of the average power of laser beam 190 into first-order beam 192(1).

Curve 210 of diagram 204 indicates the average power $P_{AVE,100(1)}$ of frequency-converted beam 198(1) when AOM 110 is turned off at time $t_1$ and then turned on again at time $t_2$. Curve 230 of diagram 206 indicates the corresponding average power $P_{AVE,198(0)}$ of frequency-converted beam 198(0). For comparison, curve 220 of diagram 204 indicates the average power $P_{AVE,100(1)}$ of frequency-converted beam 198(1) in a modified system where only first-order beam 192(1), and not zeroth-order beam 192(0), is forwarded to nonlinear crystal 120.

Considering first curve 220, where only one diffractive order of laser beam 190 is forwarded to nonlinear crystal 120, the average power drops from its initial value $P_0$ to zero at time $t_1$. At this time, since zeroth-order beam 192(0) is not forwarded to nonlinear crystal 120, nonlinear crystal 120 no longer experiences a laser-induced heat load and its temperature therefore decreases. When AOM 110 turns back on at time $t_2$, the temperature of nonlinear crystal 120 is too low for proper phase-matching. As a result, the average power of frequency-converted beam 198(1) is significantly lower than $P_0$ at time $t_2$ and increases only gradually, over a transient time period $\Delta t$, to reach $P_0$ at a later time.

Now, consider curve 210 pertaining to system 100. Curve 210 is identical to curve 220 up to time $t_2$. However, when AOM 110 turns off at time $t_1$, the average power that was in first-order beam 192(1) prior to time $t_1$ is transferred to zeroth-order beam 192(0) and thereby still forwarded to nonlinear crystal 120. In the period from time $t_1$ to time $t_2$, nonlinear crystal 120 frequency converts zeroth-order beam 192(0) to generate frequency-converted beam 198(0) with average power $P_0$, as indicated by curve 230 of diagram 206. Therefore, the laser-induced heat load in nonlinear crystal 120 is unchanged. Similarly, the laser-induced heat load does not change when AOM 110 turns back on at time $t_2$. Consequently, when AOM 110 is turned back on at time $t_2$, the temperature of the nonlinear crystal remains proper for phase matching, and the average power of frequency-converted beam 198(1) immediately jumps from zero to $P_0$. In other words, system 100 performs transient-free power modulation of frequency-converted beam 198(1) in this scenario.

In most practical situations, it is not possible for AOM 110 to switch the average power between zeroth-order beam 192(0) and first-order beam 192(1) with a contrast of 100%. As discussed above, a contrast in the 60-95% range is more realistic. Thus, in a more realistic 100% switching scenario, AOM 110 always transmits a non-zero fraction of laser beam 190 as zeroth-order beam 192(0). Depending on the form of frequency conversion taking place in nonlinear crystal 120, a switching contrast of less than 100% may cause transient phase-matching degradation. Specifically, when the efficiency of frequency conversion depends nonlinearly on the power of each of zeroth-order beam 192(0) and first-order beam 192(1), the combined average power of frequency-converted beams 198(0) and 198(1) is not proportional to the combined average power of zeroth-order beam 192(0) and first-order beam 192(1). For example, when nonlinear crystal 120 is configured for frequency doubling, the combined average power of frequency-converted beams 198(0) and 198(1) is, in a first approximation, proportional to the sum of the squares of the respective average powers of zeroth-order beam 192(0) and first-order beam 192(1). Therefore, in the absence of further mitigation, the combined heat load in nonlinear crystal 120 from frequency-converted beams 198(0) and 198(1) is greater when AOM 110 transmits all of laser beam 190 into zeroth-order beam 192(0) than when AOM 110 shares the average power of laser beam 190 between zeroth-order beam 192(0) and first-order beam 192(1). The resulting transient phase-matching degradation is, as compared to the transient in curve 220, a higher-order effect and therefore less severe. Nevertheless, it may be beneficial to avoid such transient behavior.

Transient phase-matching degradation caused by changes in frequency conversion efficiency, when the average-power ratio between zeroth-order beam 192(0) and first-order beam 192(1) is changed, may be mitigated by adjusting the average power of laser beam 190 to compensate for the changes in frequency conversion efficiency. Controller 140 may control laser 130 to make such adjustments to the average power of laser beam 190. Accordingly, in the example of second harmonic generation, controller 140 may (a) increase the average power of laser beam 190 at the same time as switching AOM 110 to decrease the average-power discrepancy between zeroth-order beam 192(0) and first-order beam 192(1), and (b) decrease the average power of laser beam 190 at the same time as controlling AOM 110 to increase the average-power discrepancy between zeroth-order beam 192(0) and first-order beam 192(1). Diagram 208 illustrates one example of such mitigation. In this example, the average power $P_{AVE,190}$ of laser beam 190, indicated by curve 240, is decreased from an initial level $P_{IN}$ to a lower level $P'_{IN}$ at time $t_1$, and then increased to $P_{IN}$ again at time $t_2$. This adjustment of the average power of laser beam 190 compensates for the increased frequency conversion efficiency between times $t_1$ and $t_2$ when the average power of laser beam 190 is entirely in zeroth-order beam 192(0), as opposed to being shared between zeroth-order beam 192(0) and first-order beam 192(1).

Without departing from the scope hereof, the scenario of FIG. 2 may be applied to the situation where frequency-converted beam 198(0) is used as the frequency-converted output laser beam. Mitigation for changes in frequency conversion efficiency caused by changes in the average-power ratio between zeroth-order beam 192(0) and first-order beam 192(1) may be implemented in this situation in a manner similar to when frequency-converted beam 198(1) is used as the frequency-converted output laser beam, as discussed above.

Figure 3:
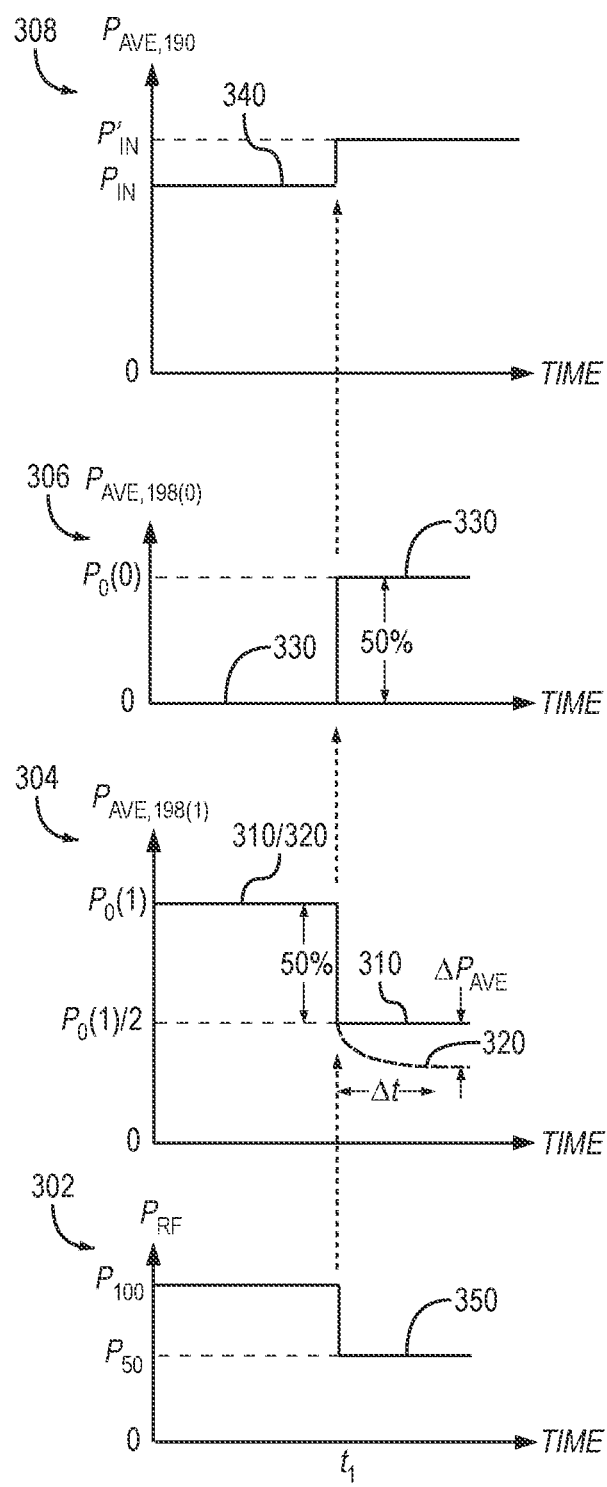
FIG. 3 compares the average-power output of the system of FIG. 1, in a 50% switching scenario, to that of a system that forwards only one diffractive order to frequency conversion.

FIG. 3 is a timing diagram comparing the average-power output of system 100, in a 50% switching scenario, to that of a system that forwards only one diffractive order to frequency conversion. FIG. 3 shows temporally synchronized diagrams 302, 304, 306, and 308. Diagram 302 plots the power $P_{RF}$ of an RF electrical signal supplied to AOM 110 by controller 140. Diagram 304 plots the average power $P_{AVE,198(1)}$ of frequency-converted beam 198(1). Diagram 306 plots the average power $P_{AVE,198(0)}$ of frequency-converted beam 198(0). Diagram 308 plots the average power $P_{AVE,190}$ of laser beam 190.

In the FIG. 3 scenario, frequency-converted beam 198(1) is used as the frequency-converted output laser beam. Initially, controller 140 drives AOM with an RF electrical signal of power $P_{100}$ to diffract all of laser beam 190 into first-order beam 192(1). This results in the generation of frequency-converted beam 198(1) at an average power $P_0(1)$, with nonlinear crystal 120 being at the optimum temperature for either critical or non-critical phase matching. It is the intention to reduce the average power of frequency-converted beam 198(1) to 50% of $P_0(1)$ at a time $t_1$. To carry out this 50% switching scenario, controller 140 drives AOM 110 with an RF electrical signal of power $P_{100}$ (see curve 350 of diagram 302) to diffract at least a fraction of the average power of laser beam 190 into first-order beam 192(1) up to time $t_1$. At time $t_1$, controller 104 reduces the RF electrical signal to a lower power $P_{50}$ such that AOM 110 transfers some of the average power from first-order beam 192(1) to zeroth-order beam 192(0). This change at time $t_1$ reduces the average power of frequency-converted beam 198(1).

Curve 310, plotted in diagram 304, indicates the average power $P_{AVE,198(1)}$ of frequency-converted beam 198(1) when AOM 110, at time $t_1$, reduces the amount of average power diffracted into first-order beam 192(1), and curve 330 of diagram 306 indicates the corresponding average power $P_{AVE,198(0)}$ of frequency-converted beam 198(0). For comparison, curve 320, also plotted in diagram 304, indicates the average power $P_{AVE,198(1)}$ of frequency-converted beam 198(1) in a modified system where only first-order beam 192(1), and not zeroth-order beam 192(0), is forwarded to nonlinear crystal 120.

Considering first curve 320, where only one diffractive order of laser beam 190 is forwarded to nonlinear crystal 120, the average power drops from its initial value $P_0(1)$ to $P_0(1)/2$ at time $t_1$. Consequently, the laser-induced heat load in nonlinear crystal 120 drops at time $t_1$, and phase matching gradually degrades as the temperature of nonlinear crystal 120 drops. Due to the phase-matching degradation, the average power of frequency-converted beam 198(1) settles, at a later time after a transient time period $\Delta t$, to a value that is less than $P_0(1)/2$ by an amount $\Delta P_{AVE}$. While it may be possible to adjust the diffraction efficiency of AOM 110 or adjust the average power of laser beam 190 to correct for $\Delta P_{AVE}$, it is not possible, by such means, to prevent the transient behavior of curve 320 after time $t_1$.

In contrast, as indicated by curve 310, system 100 is capable of avoiding such transients by maintaining a stable heat load in nonlinear crystal 120. In system 100, at time $t_1$, AOM 110 transfers average power from first-order beam 192(1) to zeroth-order beam 192(0), to reduce the average power of frequency-converted beam 198(1) to $P_0(1)/2$. If the frequency conversion efficiency depends nonlinearly on the average powers of zeroth-order beam 192(0) and first-order beam 192(1), controller 140 may adjust the average power of laser beam 190 at time $t_1$ to compensate for a change in frequency conversion efficiency, in a manner similar to that discussed above in reference to FIG. 2. System 100 thereby maintains a stable heat load in nonlinear crystal 120, such that curve 310 makes a clean drop to $P_0(1)/2$ at time $t_1$, with no transient.

Diagram 308 shows one example of compensation for a change in frequency conversion. Initially, as indicated by curve 340, laser beam 190 has an average power $P_{IN}$. At time $t_1$, AOM 110 transfers average power from first-order beam 192(1) to zeroth-order beam 192(0), such that the average power is more equally shared between zeroth-order beam 192(0) and first-order beam 192(1). To compensate for the resulting reduction in frequency conversion efficiency, the average power of laser beam 190 is increased to a higher level $P'_{IN}$ at time $t_1$.

Without departing from the scope hereof, the scenario of FIG. 3 may be applied to the situation where frequency-converted beam 198(0) is used as the frequency-converted output laser beam.

Referring again to FIG. 1, nonlinear crystal 120 has a thermal impedance, such that the heat load in nonlinear crystal 120 from a laser beam causes a greater temperature increase within the envelope of the laser beam than a distance away from the laser beam. Depending on the exact value of the thermal conductivity of nonlinear crystal 120, some degree of spatial overlap between zeroth-order beam 192(0) and first-order beam 192(1) may therefore be preferred or even required in order to stabilize the heat load in nonlinear crystal 120.

Figure 4:
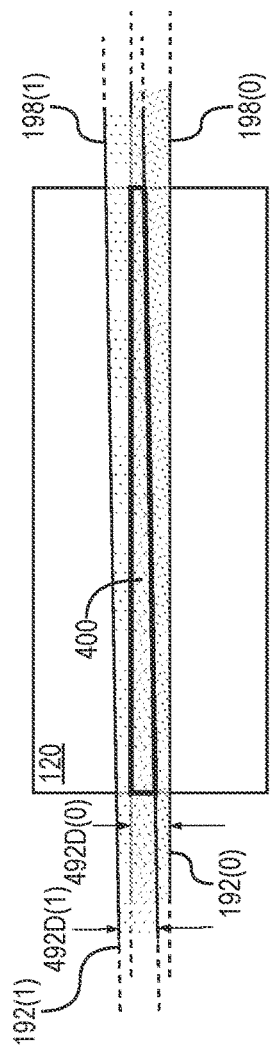
FIG. 4 illustrates an example of spatial overlap between zeroth-order and first-order beams in the nonlinear crystal of the system of FIG. 1.

FIG. 4 illustrates one example of spatial overlap between zeroth-order beam 192(0) and first-order beam 192(1) in nonlinear crystal 120. Zeroth-order beam 192(0) and first-order beam 192(1) have respective $1/e^2$ diameters 492D(0) and 492D(1), and are incident on nonlinear crystal 120 such that diameters 492D(0) and 492D(1) overlap throughout the length of nonlinear crystal 120. The region 400 of spatial overlap between zeroth-order beam 192(0) and first-order beam 192(1) is defined as the region where $1/e^2$ diameters 492D(0) and 492D(1) overlap. Based on evaluations of certain nonlinear crystals, we estimate that optimal performance is likely to be achieved when the spatial overlap is at least 90%, i.e., when spatial overlap region 400 contains at least 90% of the power of each of zeroth-order beam 192(0) and first-order beam 192(1). Mild transient behavior is expected with a spatial overlap in the range between 50% and 90%. Below 50%, more significant transient behavior is likely to occur. Therefore, in one embodiment, the spatial overlap between zeroth-order beam 192(0) and first-order beam 192(1) in nonlinear crystal 120 is at least 50%.

Figure 5:
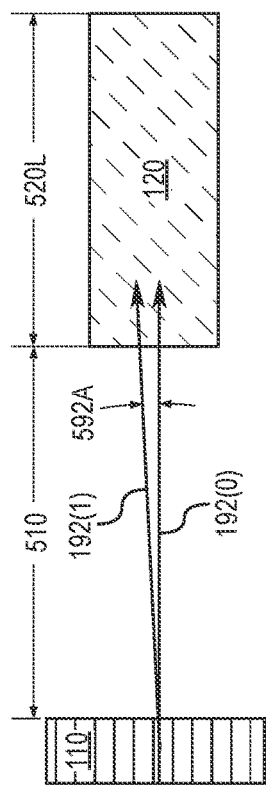
FIG. 5 illustrates a configuration of the system of FIG. 1, wherein the relative propagation angles of the zeroth-order and first-order beams are unchanged between the AOM and the nonlinear crystal, according to an embodiment.

FIG. 5 illustrates one configuration 500 of system 100, wherein the relative propagation angles of zeroth-order beam 192(0) and first-order beam 192(1) are unchanged between AOM 110 and nonlinear crystal 120. In configuration 500, the incidence angles of zeroth-order beam 192(0) and first-order beam 192(1) onto nonlinear crystal 120 are defined by the external diffraction angle 592A of AOM 110. A requirement for spatial overlap between zeroth-order beam 192(0) and first-order beam 192(1) in nonlinear crystal 120, imposes certain limits on both diffraction angle 592A and the propagation distance 510 from AOM 110 to nonlinear crystal 120. For example, with beam diameters 492D(0) and 492D(1) of 2-3 millimeters (mm) and a propagation distance 510 of about 100 mm, a spatial overlap of approximately 50%, at the entrance to nonlinear crystal 120, can be achieved only if diffraction angle 592A is less than approximately 10-20 milliradians (mrad). Thus, in one embodiment, diffraction angle 592A is less than 20 mrad. Refraction of zeroth-order beam 192(0) and first-order beam 192(1) upon entry into nonlinear crystal 120 reduces the relative angle between zeroth-order beam 192(0) and first-order beam 192(1) once inside nonlinear crystal 120. When further taking into account that the length 520L of nonlinear crystal 120 typically is less than propagation distance 510, for example 10 mm or less, the spatial overlap between zeroth-order beam 192(0) and first-order beam 192(1) at the entry is mostly maintained throughout nonlinear crystal 120.

Figure 6:
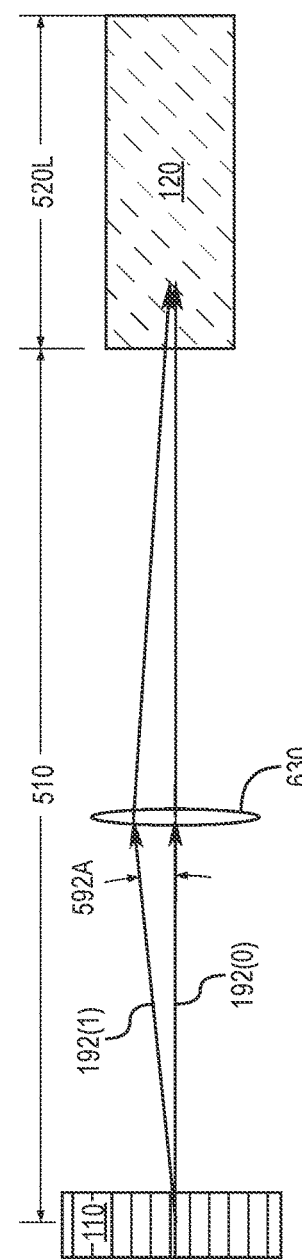
FIG. 6 illustrates another configuration of the system of FIG. 1 that further includes at least one lens that directs the zeroth-order and first-order beams to the nonlinear crystal, according to an embodiment.

FIG. 6 illustrates another configuration 600 of system 100, wherein system 100 further includes at least one lens 630 that directs zeroth-order beam 192(0) and first-order beam 192(1) to nonlinear crystal 120. Lens(es) 630 may be used to achieve a better spatial overlap between zeroth-order beam 192(0) and first-order beam 192(1) in nonlinear crystal 120 than is possible with configuration 500. Configuration 600 therefore allows for a greater diffraction angle 592A and/or a longer propagation distance 510 between AOM 110 and nonlinear crystal 120, while still achieving a desired spatial overlap. In one implementation, configuration 600 operates with a diffraction angle 592A of up to 50 mrad. Configuration 600 may also offer the convenience of greater angular separation between frequency-converted beams 198(0) and 198(1), while maintaining a desired spatial overlap between zeroth-order beam 192(0) and first-order beam 192(1) in nonlinear crystal 120.

In certain embodiments, lens(es) 630 images zeroth-order beam 192(0) and first-order beam 192(1) from AOM 110 to nonlinear crystal 120, to maximize spatial overlap in nonlinear crystal 120. Lens(es) 630 may perform such imaging with unity magnification, such that the beam sizes of zeroth-order beam 192(0) and first-order beam 192(1) are the same at nonlinear crystal 120 as at AOM 110. Alternatively, lens(es) 630 may be arranged to perform imaging with magnification or demagnification, to increase or decrease the beam sizes in nonlinear crystal 120 as compared to in AOM 110. In some scenarios, such as when laser beam 190 is a relatively powerful pulsed laser beam, it may be preferred to operate with relatively small beam sizes in AOM 110 and somewhat larger beam sizes in nonlinear crystal 120. For example, larger beam sizes help achieve a high spatial overlap, e.g., 90% or more, in nonlinear crystal 120. In such scenarios, lenses 630 may advantageously be configured to image with magnification. In one implementation, lens(es) 630 magnify by a factor in the range between 2 and 4. In other scenarios, such as when laser beam 190 is a continuous-wave laser beam, it may be preferred to operate with larger beam sizes in AOM 110 than in nonlinear crystal 120, and lenses 630 may thus advantageously be configured to image with demagnification.

Referring again to FIG. 1, when there is good spatial overlap between zeroth-order beam 192(0) and first-order beam 192(1) in nonlinear crystal 120, sum-frequency mixing of zeroth-order beam 192(0) with first-order beam 192(1) may lead to the generation of an additional output laser beam propagating between frequency-converted beams 198(0) and 198(0). This additional laser beam (not shown in FIG. 1) may (a) make separation of a single output laser beam as the desired frequency-converted output laser beam of system 100 more challenging, (b) reduce the achievable average power of the desired frequency-converted output laser beam, and (c) complicate the power modulation schemes required to achieve the transient-free behavior discussed above, e.g., in reference to FIGS. 2 and 3. However, when input laser beam 190 is pulsed, with pulse durations in the picosecond range for example, these issues may be avoided by introducing a time delay between pulses of zeroth-order beam 192(0) and pulses of first-order beam 192(1). To this effect, system 100 may include one or more glass plates 160 intersecting the propagation path of one, but not both, of zeroth-order beam 192(0) and first-order beam 192(1). Glass plate(s) 160 prevent sum-frequency mixing of zeroth-order beam 192(0) and first-order beam 192(1) by eliminating temporal overlap of their respective laser pulses in nonlinear crystal 120.

In one implementation, glass plate(s) 160 not only delay but also steer the beam propagating therethrough, to improve the spatial overlap between zeroth-order beam 192(0) and first-order beam 192(1) in nonlinear crystal 120. In this implementation, glass plate(s) 160 may include one or more glass wedges, for example a Risley prism pair.

FIG. 7 illustrates one system 700 for two-stage harmonic generation preceded by acousto-optic modulation for variation of the average power of the frequency-converted output laser beam. System 700 is an embodiment of system 100 that (a) is configured for harmonic generation in nonlinear crystal 120 and (b) implements an additional stage of harmonic generation between AOM 110 and nonlinear crystal 120. System 700 may generate the fourth harmonic, or higher, of laser beam 190.

System 700 includes AOM 110 and two nonlinear crystals 720 and 740. Nonlinear crystal 720 is an embodiment of nonlinear crystal 120. Nonlinear crystal 740 is placed in the propagation path of zeroth-order beam 192(0) and first-order beam 192(1) from AOM 110 to nonlinear crystal 720. Nonlinear crystal 740 applies a first stage of harmonic generation to each of zeroth-order beam 192(0) and first-order beam 192(1). Nonlinear crystal 740 thereby at least partly converts zeroth-order beam 192(0) and first-order beam 192(1) to zeroth-order harmonic beam 792H(0) and first-order harmonic beam 792H(1), respectively. AOM 110 and nonlinear crystal 740 thus cooperate to form a harmonic generator 702 that generates two harmonic beams 792H(0) and 792H(1) from laser beam 190. Subsequently, system 700 directs harmonic beams 792H(0) and 792H(1) to nonlinear crystal 720 for a second stage of harmonic generation. Nonlinear crystal 720 at least partly converts zeroth-order harmonic beam 792H(0) into a harmonic laser beam 798HH(0) and at least partly converts first-order harmonic beam 792H(1) into a harmonic laser beam 798HH(1). Harmonic laser beams 798HH(0) and 798HH(1) are at least second harmonics of harmonic beams 792H(0) and 792H(1), respectively, and at least fourth harmonics of laser beam 190.

Harmonic beams 798HH(0) and 798HH(1) are embodiments of frequency-converted beams 198(0) and 198(1), respectively. In operation, either one of harmonic beams 798HH(0) and 798HH(1) may be used as the frequency-converted output laser beam of system 700, while the other one of harmonic beams 798HH(0) and 798HH(1) (possibly together with the corresponding one of harmonic beams 792H(0) and 792H(1)) serves to stabilize the heat load in nonlinear crystal 720, as discussed above in reference to FIGS. 1-3. System 700 may include beam block 180, arranged to block the one of harmonic beams 798HH(0) and 798HH(1) not used as the frequency-converted output laser beam. While FIG. 7 depicts a scenario where harmonic beam 798HH(1) has the role of the frequency-converted output laser beam, harmonic beam 798HH(0) may have this role instead, without departing from the scope hereof.

System 700 may also, when laser beam 190 is pulsed, include glass plate(s) 160 to prevent both (a) sum-frequency mixing between zeroth-order beam 192(0) and first-order beam 192(1) in nonlinear crystal 740 and (b) sum-frequency mixing between zeroth-order harmonic beam 792H(0) and first-order harmonic beam 792H(1) in nonlinear crystal 720. When included in system 700, glass plate(s) 160 may further steer the beam propagating therethrough, to improve spatial overlap between zeroth-order harmonic beam 792H(0) and first-order harmonic beam 792H(1) in nonlinear crystal 720. Beam steering performed by glass plate(s) 160 may also serve to optimize and equalize phase matching of zeroth-order harmonic beam 792H(0) and first-order harmonic beam 792H(1) in nonlinear crystal 720.

The presence of both zeroth-order beam 192(0) and first-order beam 192(1) in nonlinear crystal 740 provides heat load stabilization also in nonlinear crystal 740. However, the laser-induced heat load in nonlinear crystal 740 is likely far less than the heat load in nonlinear crystal 720 since the absorption of most commonly used nonlinear crystals is highest for shorter wavelengths, at least within the wavelength range spanning from the near-infrared, visible, and ultraviolet spectra. For similar reasons, the heat load contribution in nonlinear crystal 720 from non-frequency-converted residual portions of zeroth-order beam 192(0) and first-order beam 192(1), proceeding as respective residual beams 792R(0) and 792R(1), is likely relatively small compared to the heat load contribution from harmonic beams 798HH(0) and 798HH(1). Since the dominant contribution to the heat load in nonlinear crystal 720 most likely comes from harmonic beams 798HH(0) and 798HH(1), the performance of system 700 may be particularly dependent on proper phase matching of both zeroth-order harmonic beam 792H(0) and first-order harmonic beam 792H(1) to respective harmonic beams 798HH(0) and 798HH(1).

In one implementation, system 700 is configured to generate an ultraviolet laser beam by fourth harmonic generation in two frequency doubling stages. In this implementation, laser beam 190 is near-infrared, harmonic beams 792H(0) and 792H(1) are green, and harmonic beams 798HH(0) and 798HH(1) are ultraviolet. For example, when laser 130 (not shown in FIG. 7) is a Nd:YAG, Nd:YVO$_4$, or Yb:YAG laser, laser beam 190 may have a wavelength of 1064 nm or 1030 nm, such that the wavelength of harmonic beams 798HH(0) and 798HH(1) is 266 nm or 258 nm. Commonly used doubling crystals, such as BBO, CLBO, and LTB, exhibit significant absorption at such short wavelengths. When the fourth-harmonic output laser beam, generated by this implementation of system 700, has relatively high average power, e.g., about a watt or more, the resulting heat load in nonlinear crystal 720 is substantial. Without generating an additional fourth-harmonic laser beam, serving to stabilize the heat load nonlinear crystal 720, it would not be possible to avoid transients when varying the output power of the fourth-harmonic output laser beam. System 700 facilitates transient-free variation the average power of the fourth-harmonic output laser beam.

The propagation distance between AOM 110 and nonlinear crystal 720 may, for practical reasons, be too long to achieve a sufficient spatial overlap between harmonic beams 792H(0) and 792H(1) in nonlinear crystal 720 without implementing some form of beam steering. Therefore, system 700 may, although not depicted in FIG. 7, include one or more lenses between AOM 110 and nonlinear crystal 720. These lenses may operate in a manner similar to that of lens(es) 630. In one example, a first lens or set of lenses images zeroth-order beam 192(0) and first-order beam 192(1) from AOM 110 to nonlinear crystal 720.

Beam propagation angles may differ from those depicted in FIG. 7. For example, walk-off of harmonic beams 792H(0) and 792H(1) may take place in a plane that is orthogonal to the diffraction plane of AOM 110.

Although not shown in FIG. 7, system 700 may include a mechanism for adjusting the orientation of nonlinear crystal 720 relative to the propagation directions of zeroth-order harmonic beam 792H(0) and first-order harmonic beam 792H(1) so as to phase match zeroth-order harmonic beam 792H(0) and first-order harmonic beam 792H(1) to the same degree. This mechanism may be similar to that discussed above in reference to FIG. 1 and pertaining to phase matching in nonlinear crystal 120. When implemented in system 700 as a beam-rotating optic, this optic may be placed in the propagation path of zeroth-order harmonic beam 792H(0) and first-order harmonic beam 792H(1) between nonlinear crystals 740 and 720, or in the path of zeroth-order beam 192(0) and first-order beam 192(1) between AOM 110 and nonlinear crystal 740.

FIG. 8 illustrates one system 800 for two-stage harmonic generation with inter-stage acousto-optic modulation for variation of the average power of the frequency-converted output laser beam. System 800 is an embodiment of system 100 that (a) is configured for harmonic generation in nonlinear crystal 120 and (b) generates laser beam 190 as a harmonic of a precursor laser beam 890. System 800 may generate the fourth harmonic, or a higher harmonic, of the precursor laser beam 190.

System 800 includes AOM 110 and nonlinear crystals 720 and 740. In system 800, nonlinear crystal 740 is placed in the propagation path of precursor laser beam 890 prior to AOM 110. Nonlinear crystal 740 may be integrated in laser 130. Nonlinear crystal 740 at least partly frequency converts precursor laser beam 890 to form laser beam 190 as a harmonic of precursor laser beam 890. Next, AOM 110 and nonlinear crystal 720 process laser beam 190 as discussed above in reference to FIG. 1, with nonlinear crystal 720 generating harmonics of zeroth-order beam 192(0) and first-order beam 192(1). Nonlinear crystal 720 thereby at least partly frequency converts zeroth-order beam 192(0) into a harmonic laser beam 898HH(0) and at least partly frequency converts first-order beam 192(1) into a harmonic laser beam 898HH(1). Harmonic laser beams 898HH(0) and 898HH(1) are at least second harmonics of laser beam 190, and at least fourth harmonics of precursor laser beam 890.

As in system 700, the dominant contribution to the heat load in nonlinear crystal 720 in system 800 most likely comes from harmonic beams 898HH(0) and 898HH(1). The performance of system 800 may therefore be particularly dependent on proper phase matching of both zeroth-order beam 192(0) and first-order beam 192(1) to respective harmonic beams 898HH(0) and 898HH(1).

In one implementation, system 800 is configured to generate an ultraviolet laser beam by fourth harmonic generation in two frequency doubling stages. In this implementation, precursor laser beam 890 is near-infrared, laser beam 190 is green, and harmonic beams 898HH(0) and 898HH(1) are ultraviolet. For example, when precursor laser beam 890 is generated by a Nd:YAG, Nd:YVO$_4$, or Yb:YAG laser, precursor laser beam 890 may have a wavelength of 1064 nm or 1030 nm, such that wavelength of harmonic beams 898HH(0) and 898(1) is 266 nm or 258 nm. System 800 is capable of stabilizing the heat load in nonlinear crystal 720 such that the average power of even such a short-wavelength fourth-harmonic output laser beam may be varied without transient behavior.

Although not depicted in FIG. 8, system 800 may include one or more lenses 630 between AOM 110 and nonlinear crystal 720, as discussed above in reference to FIG. 6. System 800 may also include glass plate(s) 160 to prevent sum-frequency mixing between zeroth-order beam 192(0) and first-order beam 192(1) in nonlinear crystal 720, when laser beam 190 is pulsed. When included in system 800, glass plate(s) 160 may also provide beam steering.

A residual portion of precursor laser beam 890, not frequency-converted in nonlinear crystal 740, may propagate to nonlinear crystal 720 as a residual beam 890R. AOM 110 may (a) transmit all of residual beam 890R as a zeroth-order beam 892(0), or (b) diffract a portion of residual beam 890R to generate both a zeroth-order residual beam 892R(0) and, e.g., a first-order residual beam 892R(1). Residual beams 892R(0) and 892R(1) may propagate to nonlinear crystal 720 and contribute to heat load therein, although likely at a lower level due to their longer wavelength. This does not degrade the heat load stability in nonlinear crystal 720.

Beam propagation angles may differ from those depicted in FIG. 8. For example, walk-off of laser beam 190 may take place in a plane that is orthogonal to the diffraction plane of AOM 110.

Although not shown in FIG. 8, system 800 may include a mechanism for adjusting the orientation of nonlinear crystal 720 relative to the propagation directions of zeroth-order beam 192(0) and first-order beam 192(1) so as to phase match zeroth-order beam 192(0) and first-order beam 192(1) to the same degree, as discussed above in reference to FIG. 1.

As compared to system 700, system 800 benefits from AOM 110 being closer to nonlinear crystal 720, thereby increasing the possibility of achieving sufficient spatial overlap between the diffracted beams in nonlinear crystal 720 without using a lens. On the other hand, at least some implementations of system 700 may benefit from AOMs in the near-infrared generally being capable of withstanding higher powers than those in the visible as well as often being less costly.

In system 800, AOM 110 and nonlinear crystal 740 cooperate to form a harmonic generator 802 that generates two harmonic beams of precursor laser beam 890, namely zeroth-order beam 192(0) and first-order beam 192(1). Harmonic generator 802 is similar to harmonic generator 702 of system 700 apart from the order of AOM 110 and nonlinear crystal 740 being interchanged. Each of harmonic generators 702 and 802 are second-harmonic generators when nonlinear crystal 740 is a doubling crystal.

Figure 9:
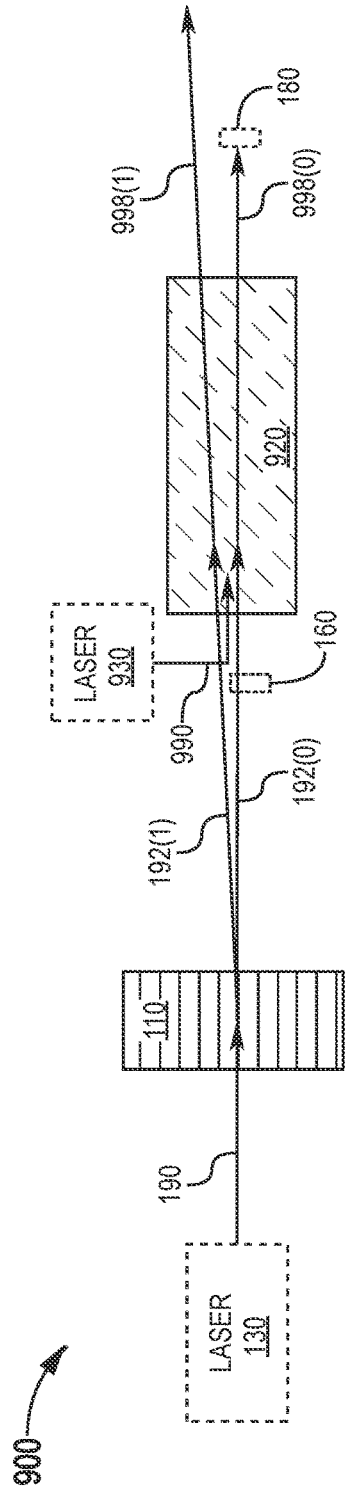
FIG. 9 illustrates a system for generating a frequency converted output laser beam by sum- or difference-frequency mixing, according to an embodiment.

FIG. 9 illustrates one system 900 for generating a frequency converted output laser beam by sum- or difference-frequency mixing. System 900 is an embodiment of system 100 wherein nonlinear crystal 120 is implemented as a nonlinear crystal 920 that subjects each of zeroth-order beam 192(0) and first-order beam 192(1) to sum- or difference-frequency mixing with a second input laser beam 990. Nonlinear crystal 920 thereby generates respective frequency-converted laser beams 998(0) and 998(1), either one of which may be used as the frequency-converted output laser beam of system 900. System 900 may include a laser 930 that generates laser beam 990. For clarity of illustration, FIG. 9 depicts laser beam 990 as entering nonlinear crystal 920 offset from zeroth-order beam 192(0) and first-order beam 192(1). In practical implementations, laser beam 990 is directed to spatially overlap with at least one of zeroth-order beam 192(0) and first-order beam 192(1) for efficient frequency conversion in nonlinear crystal 920. Laser beam 990 may enter nonlinear crystal 920 collinearly with one of zeroth-order beam 192(0) and first-order beam 192(1).

When nonlinear crystal 920 performs sum-frequency mixing, frequency-converted beams 998(0) and 998(1) have shorter wavelength than laser beam 990, zeroth-order beam 192(0), and first-order beam 192(1) and may therefore be the primary sources of laser-induced heat load in nonlinear crystal 920. This is expected to be the case especially if frequency-converted beams 998(0) and 998(1) are ultraviolet while laser beam 990, zeroth-order beam 192(0), and first-order beam 192(1) are visible or near-infrared. In such a scenario, the performance of system 900 may be particularly dependent on proper phase matching of both zeroth-order beam 192(0) and first-order beam 192(1) (and laser beam 990) to respective frequency-converted beams 998(0) and 998(1).

When nonlinear crystal 920 instead performs difference-frequency mixing, frequency-converted beams 998(0) and 998(1) have longer wavelength (e.g., mid-infrared) than the laser beams incident on nonlinear crystal 920, such that the incident laser beams may be the primary sources of laser-induced heat load in nonlinear crystal 920. In this scenario, it may be less important or even unnecessary to properly phase match both of zeroth-order beam 192(0) and first-order beam 192(1) to generate both of frequency-converted laser beams 998(0) and 998(1). It may be sufficient to direct both of zeroth-order beam 192(0) and first-order beam 192(1) to nonlinear crystal 920, for example with spatial overlap as discussed above in reference to FIG. 4, but phase match only one of zeroth-order beam 192(0) and first-order beam 192(1) so as to generate only one of frequency-converted laser beams 998(0) and 998(1) with substantial average power. Thus, without departing from the scope hereof, system 900 may be configured to generate only one of frequency-converted laser beams 998(0) and 998(1).

Although not depicted in FIG. 9, system 900 may include one or more lenses 630 between AOM 110 and nonlinear crystal 920, as discussed above in reference to FIG. 6. Furthermore, either one of frequency-converted laser beams 998(0) and 998(1) may be used as the frequency-converted output laser beam of system 900, and beam block 180 may be positioned accordingly.

Figure 10:
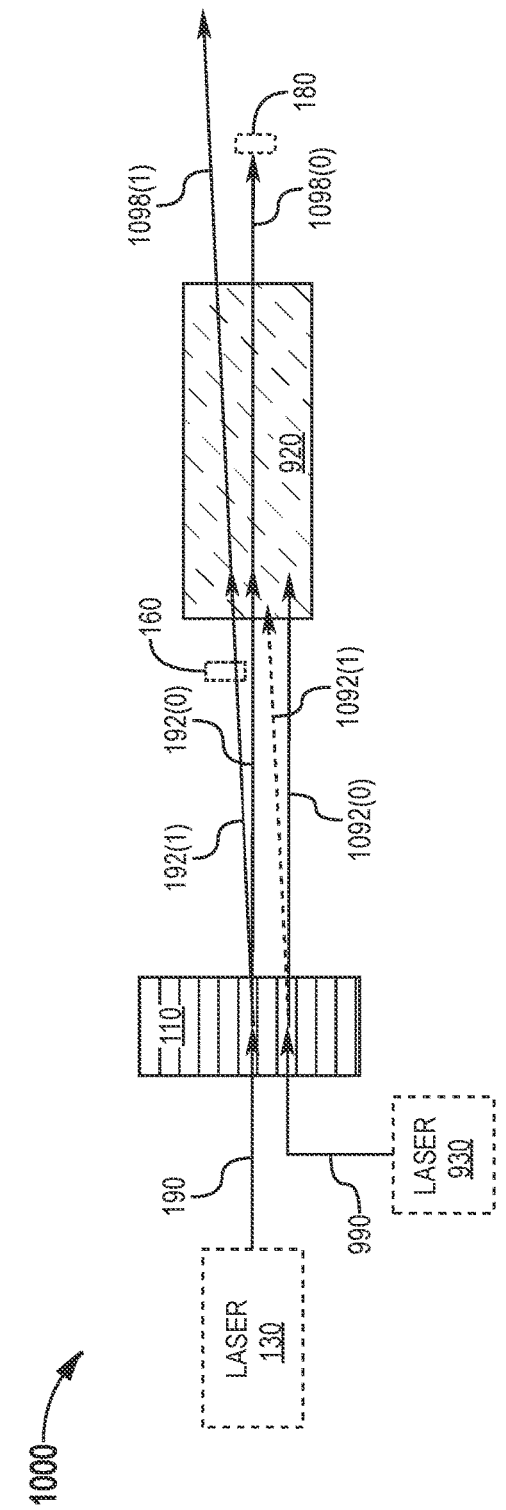
FIG. 10 illustrates another system for generating a frequency converted output laser beam by sum- or difference-frequency mixing, according to an embodiment.

FIG. 10 illustrates another system 1000 for generating a frequency converted output laser beam by sum- or difference-frequency mixing. System 1000 is similar to system 900 except for directing laser beam 990 into AOM 110. For clarity of illustration, FIG. 10 depicts laser beam 990 as entering AOM 110 offset from laser beam 190. In practical implementations, for the purpose of efficient frequency conversion in nonlinear crystal 920, laser beam 990 may be at least nearly collinear with laser beam 190 upon entering AOM 110. Depending on whether the diffraction condition for the laser beam 990 is met, AOM 110 may or may not effectively diffract laser beam 990. AOM 110 may transmit all or at least the majority of laser beam 990 as a zeroth-order beam 1092(0) with little or no diffraction into a first-order beam 1092(1). Alternatively, AOM 110 may diffract a substantial portion of laser beam 990 into first-order beam 1092(1). Zeroth-order beam 1092(0) and, if generated, first-order beam 1092(1) proceed to nonlinear crystal 920 to participate in sum- or difference-frequency mixing with zeroth-order beam 192(0) and first-order beam 192(1), as discussed above in reference to FIG. 9.

As compared to system 900, operation of system 1000 may be more complex due to possible diffraction of laser beam 990 by AOM 110. On the other hand, with entry of laser beam 990 prior to AOM 110, system 1000 may allow for a shorter propagation distance between AOM 110 and nonlinear crystal 920. This shorter propagation distance may facilitate a greater spatial overlap between zeroth-order beam 192(0) and first-order beam 192(1) in nonlinear crystal 920, in embodiments that do not incorporate lens(es) 630.

Each of systems 900 and 1000 may include glass plate(s) 160 to prevent sum-frequency mixing between zeroth-order beam 192(0) and first-order beam 192(1) in nonlinear crystal 920, when laser beam 190 is pulsed, as well as to provide beam steering. In either one of systems 900 and 1000, laser beam 990 may originate from laser 130 instead of using a second laser 930. In one embodiment, laser beam 190 is subjected to harmonic generation before AOM 110, such that sum-frequency mixing between a harmonic of laser beam 190 (an example of laser beam 990) and a residual unconverted portion of laser beam 190 can take place in nonlinear crystal 920. In another embodiment, zeroth-order beam 192(0) and first-order beam 192(1) pass through a nonlinear crystal for harmonic generation after AOM 110, such that sum-frequency mixing between harmonics of zeroth-order beam 192(0) and first-order beam 192(1) and residual unconverted portions of zeroth-order beam 192(0) and first-order beam 192(1) can take place in nonlinear crystal 920. Such an embodiment is discussed in further detail below in reference to FIG. 11.

Figure 11:
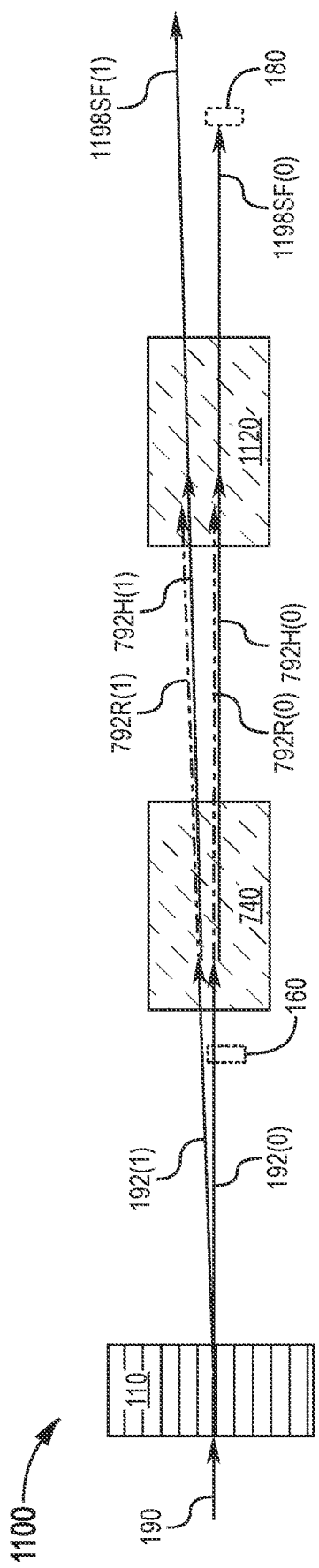
FIG. 11 illustrates a system for two-stage harmonic generation, involving subjecting an input laser beam to a first stage of partial harmonic generation followed by a second stage of sum-frequency mixing of the resulting harmonic beam with a remaining portion of the input laser beam, according to an embodiment.

FIG. 11 illustrates one system 1100 for two-stage harmonic generation, involving subjecting laser beam 190 to a first stage of partial harmonic generation followed by a second stage of sum-frequency mixing of the resulting harmonic with a remaining portion of laser beam 190 not frequency converted in the first stage. System 1100 is an embodiment of system 100 and may be viewed as a modification of system 700.

As compared to system 700, system 1100 implements nonlinear crystal 720 as a sum-frequency-generation nonlinear crystal 1120, and system 1100 relies on nonlinear crystal 740 only partly frequency converting each of zeroth-order beam 192(0) and first-order beam 192(1). Nonlinear crystal 1120 generates (a) a frequency-converted laser beam 1198SF(0) from sum-frequency mixing of zeroth-order harmonic beam 792H(0) with residual beam 792R(0) and (b) a frequency-converted laser beam 1198SF(1) from sum-frequency mixing of first-order harmonic beam 792H(1) with residual beam 792R(1). When system 1100 implements nonlinear crystal 740 as a doubling crystal, frequency-converted beams 1198SF(0) and 1198SF(1) are third harmonics of laser beam 190.

Either one of frequency-converted beams 1198SF(0) and 1198SF(1) may be used as the frequency-converted output laser beam of system 1100, and system 1100 may implement beam block 180 accordingly. Beam propagation angles may differ from those depicted in FIG. 11. For example, walk-off of harmonic beams 792H(0) and 792H(1) may take place in a plane that is orthogonal to the diffraction plane of AOM 110.

In a manner similar to this modification of system 700 to form system 1100 with sum-frequency mixing, system 800 may be modified for sum-frequency mixing in nonlinear crystal 720. This modification relies on nonlinear crystal 740 only partly frequency converting precursor laser beam 890 to laser beam 190. Depending on, e.g., the respective polarizations of laser beam 190 and residual beam 890R, AOM 110 may diffract one of laser beam 190 and residual beam 890R more efficiently than the other. Sum-frequency mixing in nonlinear crystal 720 involves either (a) mixing of each of zeroth-order beam 192(0) and first-order beam 192(1) with residual beam 890R (or one or more diffracted orders thereof), or (b) mixing of each of zeroth-order residual beam 892R(0) and first-order residual beam 892R(1) with laser beam 190 (or one or more diffracted orders thereof).

Figure 12:
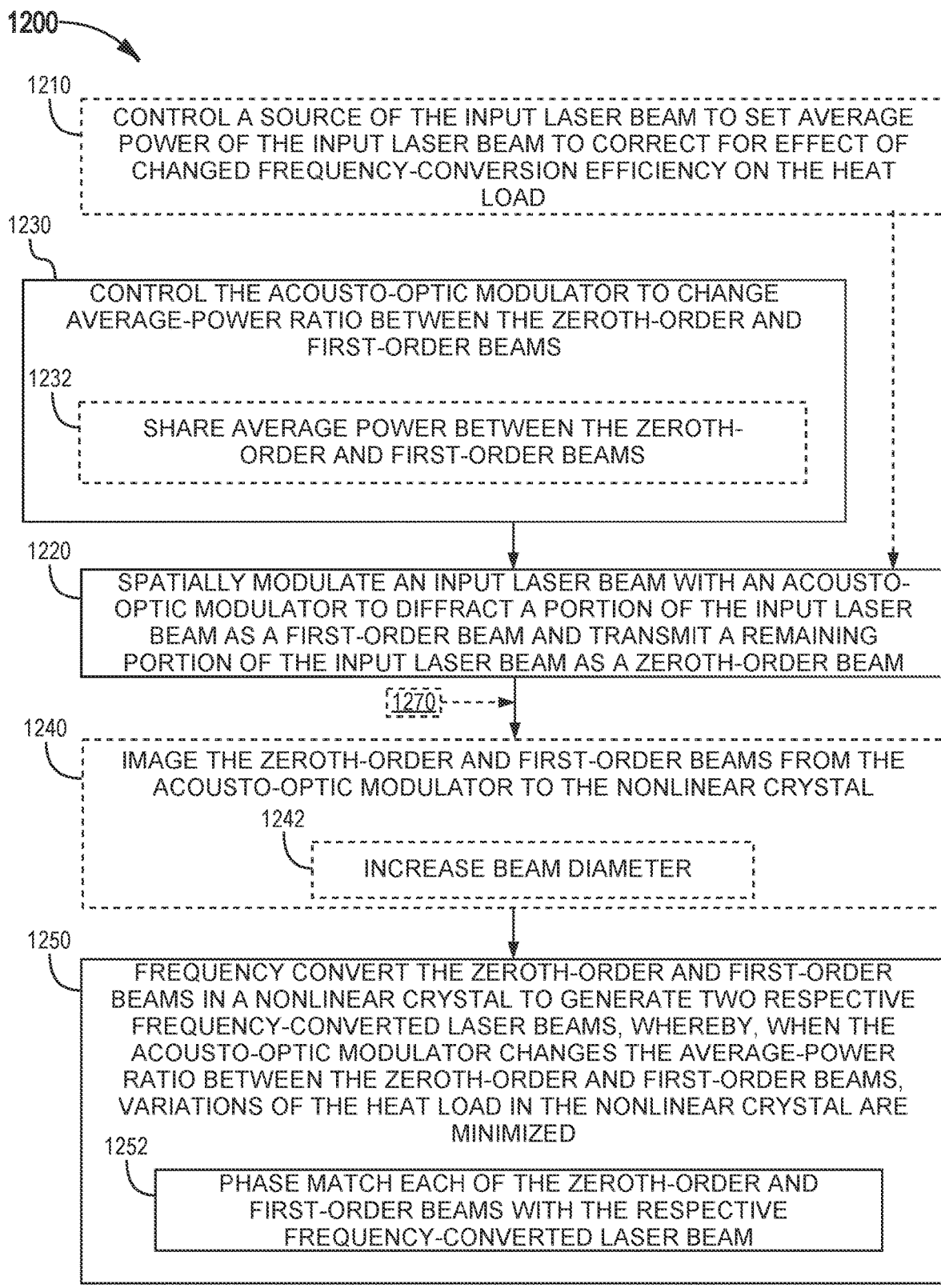
FIG. 12 is a flowchart for a method for nonlinear frequency conversion of a laser beam in a nonlinear crystal, according to an embodiment. This method is configured to maintain a stable heat load in the nonlinear crystal while varying the average power of a frequency-converted output laser beam.

FIG. 12 is a flowchart for one method 1200 for nonlinear frequency conversion of a laser beam in a nonlinear crystal.

Method 1200 is configured to maintain a stable heat load in the nonlinear crystal while varying the average power of a frequency-converted output laser beam. Method 1200 may be performed by system 100. Method 1200 includes steps 1220, 1230, and 1250.

Step 1220 spatially modulates an input laser beam with an AOM. The AOM diffracts a portion of the input laser beam into a first diffractive order to generate a first-order beam. The AOM transmits a non-diffracted portion of the input laser beam as a zeroth-order beam. In one example of step 1220, AOM 110 diffracts a portion of laser beam 190 into first-order beam 192(1) and transmits a non-diffracted portion of laser beam 190 as zeroth-order beam 192(0).

Step 1230 controls the AOM to change the average-power ratio between the zeroth-order and first-order beams. In one example of step 1230, controller 140 changes an RF electrical power to AOM 110 to transfer average optical power between zeroth-order beam 192(0) and first-order beam 192(1). Controller 140 thereby increases the average power in zeroth-order beam 192(0) and decreases the average power in first-order beam 192(1), or vice versa.

Step 1250 frequency converts the zeroth-order and first-order beams in a nonlinear crystal to generate two respective frequency-converted laser beams. Step 1250 includes a step 1252 of phase matching each of the zeroth-order and first-order beams with the respective frequency-converted laser beam in the nonlinear crystal to ensure efficient frequency conversion of both the zeroth-order beam and the first-order beam. For reasons similar to those discussed above in reference to FIG. 1-3, by frequency converting both the zeroth-order beam and the first-order beam, as opposed to just one of them, step 1250 minimized variations of the heat load in the nonlinear crystal when step 1230 changes the average-power ratio between the zeroth-order and first-order beams. In one example of step 1250, nonlinear crystal 120 at least partly frequency converts each of zeroth-order beam 192(0) and first-order beam 192(1) to generate respective frequency-converted beams 198(0) and 198(1), as discussed above in reference to FIG. 1.

Either one of the two frequency-converted laser beams, generated in step 1250, may be used as the frequency-converted output laser beam. Method 1200 may vary the average power of the frequency-converted output laser beam according to any one of the scenarios discussed above in reference to FIGS. 2 and 3.

The frequency conversion in step 1250 may be harmonic generation, sum-frequency mixing, or difference-frequency mixing, for example as discussed above in reference to FIGS. 1, 7, 8, 9, and 10.

In one embodiment, step 1230 implements a step 1232 of sharing average power between the zeroth-order and first-order beams, such that each of the first-order and zeroth-order beams has non-negligible average power. When implementing step 1232, step 1230 increases the average power of one of the zeroth-order and first-order beams from essentially zero to a non-negligible level, or step 1230 changes the average-power ratio between the zeroth-order and first-order beams while maintaining non-negligible average power in each. This embodiment of method 1200 may vary the average power of the frequency-converted output laser beam according to the FIG. 3 scenario or according to the FIG. 2 scenario with less than the ideal 100% switching contrast. This embodiment of method 1200 further includes a step 1210 of correcting for the effect of a changed frequency-conversion efficiency on the heat load in the nonlinear crystal, upon changing the average-power ratio between the zeroth-order and first-order beams. Step 1210 achieves this by controlling a source of the input laser beam to set the average power of the input laser beam to an appropriate level. In one example of step 1210, controller 140 controls laser 130 to adjust the average power of laser beam 190.

Although not shown in FIG. 12, in one embodiment of method 1200, the AOM outputs the zeroth-order and first-order beams with an angle of no more than 20 milliradians in step 1230. This embodiment may achieve a sufficient spatial overlap (50%, for example) between the zeroth-order and first-order beams in the nonlinear crystal without changing the angle between the zeroth-order and first-order beams as they propagate from the AOM to the nonlinear crystal. In one example of this embodiment of method 1200, AOM 110 outputs zeroth-order beam 192(0) and first-order beam 192(1) with angle 592A therebetween being no greater than 20 milliradians, as discussed above in reference to FIG. 5.

In another embodiment, method 1200 further includes a step 1240 of imaging the zeroth-order and first-order beams from the AOM to the nonlinear crystal. Step 1240 may serve to achieve a desired spatial overlap (50%, for example) between the zeroth-order and first-order beams in the nonlinear crystal. Step 1240 may include a step 1242 of increasing the beam diameter of the zeroth-order and first-order beams. In one example of step 1240, lens(es) 630 image zeroth-order beam 192(0) and first-order beam 192(1) from AOM 110 to nonlinear crystal 120, as discussed above in reference to FIG. 6. Lens(es) 630 may image with non-unity magnification so as to increase or decrease the beam diameters of zeroth-order beam 192(0) and first-order beam 192(1).

When applied to a pulsed input laser beam, method 1200 may include a step 1270 of delaying pulses of one of the zeroth-order and first-order beams relative to the other one of the zeroth-order and first-order beams, so as to prevent sum-frequency mixing of the zeroth-order beam with the first-order beams in step 1250. Step 1270 is, for example, performed by glass plate(s) 160 as discussed above in reference to FIG. 1.

Figure 13:
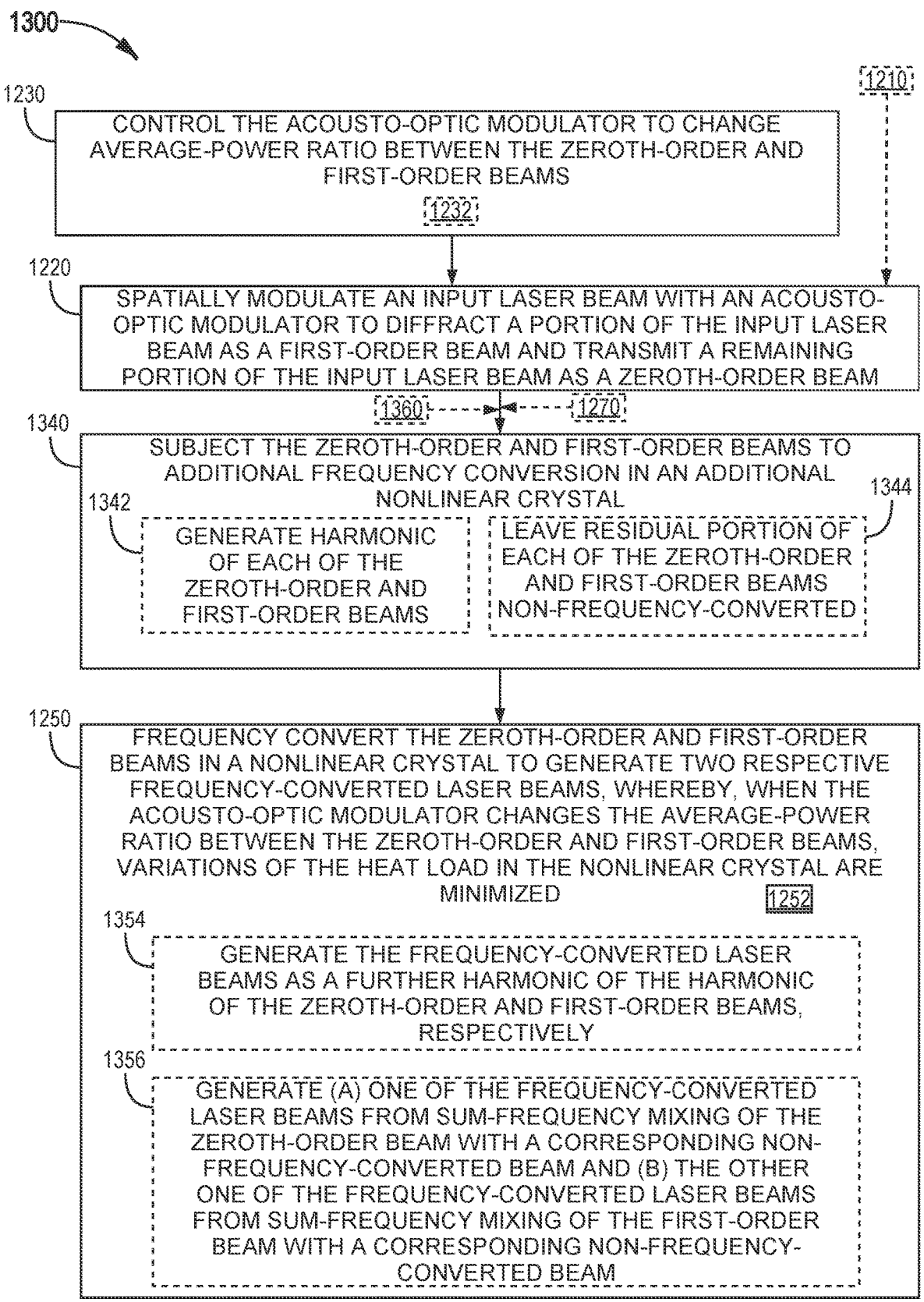
FIG. 13 is a flowchart for a method for two-stage nonlinear frequency conversion of a laser beam, according to an embodiment. This method is configured to maintain a stable heat load in the second nonlinear crystal while varying the average power of a frequency-converted output laser beam.

FIG. 13 is a flowchart for one method 1300 for two-stage nonlinear frequency conversion of a laser beam. Method 1300 is an embodiment of method 1200 that implements an additional step 1340 of nonlinear frequency conversion between acousto-optic modulation in step 1220 and nonlinear frequency conversion in step 1250. Method 1300 is performed by system 700 or 1100, for example.

Step 1340 subjects each of the zeroth-order and first-order beams, generated in step 1220, to additional nonlinear frequency conversion in an additional nonlinear crystal. Step 1340 may implement a step 1342 of performing the frequency conversion as harmonic generation. Alternatively, step 1340 performs sum- or difference-frequency mixing. In one example of step 1340, nonlinear crystal 740 generates zeroth-order harmonic beam 792H(0) and first-order harmonic beam 792H(1) from zeroth-order beam 192(0) and first-order beam 192(1), respectively, as discussed above in reference to FIG. 7 or as discussed above in reference to FIG. 11.

In one embodiment that may be performed by system 700, step 1340 implements step 1342, and step 1250 implements a step 1354 of generating the frequency-converted laser beams as a further harmonic of the zeroth-order and first-order beams, respectively. For example, each of steps 1342 and 1354 may perform frequency doubling such that the frequency-converted laser beams are fourth harmonics of the input laser beam. Method 1300 may thereby frequency-quadruple a near-infrared laser beam to generate an ultraviolet laser beam, for example with a wavelength of 266 nm or 258 nm as discussed above in reference to FIG. 7.

In another embodiment that may be performed by system 1100, step 1340 implements step 1342 and a step 1344, and step 1250 implements a step 1356. Step 1344 leaves a residual portion of each of the zeroth-order and first-order beams non-frequency-converted and passes the resulting non-frequency-converted laser beams onto the nonlinear crystal used in step 1250. In one example of step 1340 implementing step 1344, nonlinear crystal 740 only partly frequency converts each of zeroth-order beam 192(0) and first-order beam 192(1) and then forwards respective residual beams 792R(0) and 792R(1) to nonlinear crystal 1120, as discussed above in reference to FIG. 11. Step 1356 generates (a) one of the frequency-converted laser beams from sum-frequency mixing of the frequency-converted zeroth-order beam with a corresponding non-frequency-converted beam and (b) the other one of the frequency-converted laser beams from sum-frequency mixing of the frequency-converted first-order beam with a corresponding non-frequency-converted beam. When step 1340 performs second harmonic generation, the frequency-converted laser beams, generated in step 1356, are third harmonics of the input laser beam. In one example of step 1356, nonlinear crystal 1120 generates frequency-converted beams 1198SF(0) and 1198SF(1), as discussed above in reference to FIG. 11. Method 1300 may thereby frequency-triple a near-infrared laser beam to generate an ultraviolet laser beam, for example with a wavelength of 355 nm as discussed above in reference to FIG. 11.

In addition, method 1300 may include a step 1360 that images the zeroth-order and first-order beams from the AOM used in step 1220 to the nonlinear crystal used in step 1250 (the second stage of frequency-conversion). Step 1360 may be performed before or after step 1340. Step 1360 may utilize lens(es) 630, or one or more similar lenses, and perform imaging with unity magnification, greater-than-unity magnification, or less-than-unity magnification, as discussed above in reference to FIG. 6. Step 1360 may help achieve desired spatial overlaps in the nonlinear crystal used in step 1250, as discussed above in reference to FIGS. 6 and 7.

Figure 14:
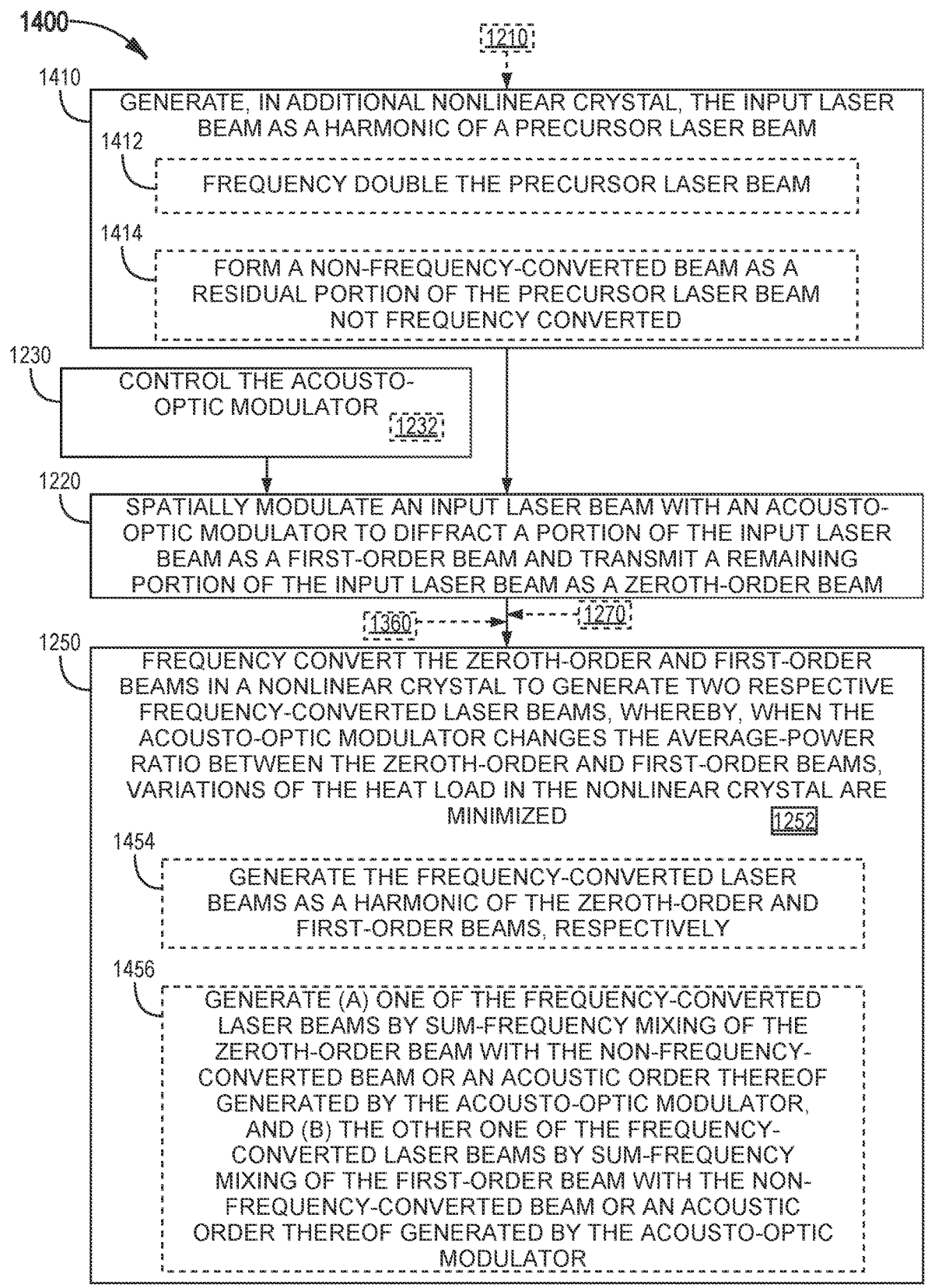
FIG. 14 is a flowchart for another method for two-stage nonlinear frequency conversion of a laser beam, according to an embodiment. This method is configured to maintain a stable heat load in the second nonlinear crystal while varying the average power of a frequency-converted output laser beam.

FIG. 14 is a flowchart for another method 1400 for two-stage nonlinear frequency conversion of a laser beam. Method 1400 is an embodiment of method 1200 that generates the input laser beam as a harmonic of a precursor laser beam in an initial frequency-conversion step 1410 performed prior to acousto-optic modulation in step 1230. Step 1410 may be performed by nonlinear crystal 740. Method 1400 is performed by system 800 or the modification thereof configured for sum-frequency mixing, for example. Step 1410 may implement a step 1412 of frequency-doubling the precursor laser beam, for example frequency-doubling a near-infrared precursor laser beam to generate a visible (e.g., green) input laser beam, as discussed above in reference to FIG. 8.

In one embodiment of method 1400 that may be performed by system 800, step 1250 implements a step 1454 of generating the frequency-converted laser beams as harmonics of the zeroth-order and first-order beams. For example, each of steps 1410 and 1454 may generate second harmonics such that the frequency-converted laser beams, generated in step 1250, are fourth harmonics of the precursor laser beam. Method 1300 may thereby frequency-quadruple a near-infrared laser beam to generate an ultraviolet laser beam, for example with a wavelength of 266 nm or 258 nm as discussed above in reference to FIG. 8.

In another embodiment of method 1400 that may be performed by system 1200, step 1410 implements step 1412 and a step 1414, and step 1250 implements a step 1456. Step 1414 leaves a residual portion of the precursor laser beam non-frequency-converted, and passes the resulting non-frequency-converted residual beam through the AOM used in step 1220. The AOM may fully or predominantly transmit the residual beam with no diffraction. Alternatively, the AOM may diffract a portion of the residual beam into, e.g., a first diffractive order. In one example of step 1410 implementing step 1414, nonlinear crystal 740 only partly frequency converts precursor laser beam 890 and then forwards both input laser beam 190 and residual beam 890R to AOM 110. Step 1456 generates one of the frequency-converted laser beams from sum-frequency mixing of the zeroth-order beam with the residual beam not frequency converted in step 1410 (and/or a diffractive order thereof generated by the AOM used in step 1220). Step 1456 generates the other one of the frequency-converted laser beams from sum-frequency mixing of the first-order beam with the residual beam not frequency-converted in step 1410 (and/or a diffractive order thereof generated by the AOM used in step 1220). When step 1410 performs second harmonic generation, the frequency-converted laser beams, generated in step 1456, are third harmonics of the precursor laser beam. Method 1400 may thereby frequency-triple a near-infrared laser beam to generate an ultraviolet laser beam, for example with a wavelength of 355 nm.

Method 1400 may include steps 1232 and 1210 as discussed above in reference to FIG. 12. When implemented in method 1400, step 1210 may be applied to the source of the precursor laser beam, as shown in FIG. 14, or step 1210 may attenuate the average power of the input laser beam as needed after its generation from the precursor laser beam.

In addition, method 1400 may include step 1360 to improve spatial overlap between the zeroth-order and first-order beams in the nonlinear crystal used in step 1250. Method 1400 may also include step 1270.

Without departing from the scope hereof, method 1400 may be modified to optimize acousto-optic modulation in step 1220 for diffraction of the precursor laser beam rather than the input laser beam generated therefrom.

The present invention is described above in terms of a preferred embodiment and other embodiments. The invention is not limited, however, to the embodiments described and depicted herein. Rather, the invention is limited only by the claims appended hereto.

What is claimed is:

1. A system for nonlinear frequency conversion, comprising:
   an acousto-optic modulator for diffracting a portion of an input laser beam as a first-order beam and transmitting a non-diffracted portion of the input laser beam as a zeroth-order beam; and
   a nonlinear crystal arranged to receive and frequency convert each of the zeroth-order and first-order beams to generate two respective frequency-converted laser beams, each of the zeroth-order and first-order beams being phase-matched to the respective frequency-converted laser beam.

2. The system of claim 1, further comprising a controller configured to simultaneously (a) change the average-power ratio between the zeroth-order and first-order beams by regulating radio-frequency electrical power applied to the acousto-optic modulator, and (b) set the average power of the input laser beam to correct for effect of changed frequency-conversion efficiency on the heat load in the nonlinear crystal.

3. The system of claim 1, wherein the zeroth-order and first-order beams spatially overlap by at least 50 percent in the nonlinear crystal.

4. The system of claim 1, further comprising one or more lenses located between the acousto-optic modulator and the nonlinear crystal and arranged to spatially overlap the zeroth-order and first-order beams in the nonlinear crystal.

5. The system of claim 4, wherein the one or more lenses are configured to image the zeroth-order and first-order beams from the acousto-optic modulator to the nonlinear crystal.

6. The system of claim 1, wherein the input laser beam is pulsed, and further comprising one or more glass plates intersecting one but not both of the zeroth-order and first-order beams to delay pulses thereof.

7. The system of claim 6, wherein the one or more glass plates include at least one wedge to steer the one of the zeroth-order and first-order beams intersected by the one or more glass plates.

8. The system of claim 1, further comprising an additional nonlinear crystal for generating the input laser beam by frequency converting a precursor laser beam.

9. The system of claim 8, wherein each of the nonlinear crystal and the additional nonlinear crystal is a frequency-doubling crystal.

10. The system of claim 1, further comprising an additional nonlinear crystal for additional frequency conversion of the zeroth-order and first-order beams prior to frequency-conversion in the nonlinear crystal.

11. The system of claim 10, wherein each of the nonlinear crystal and the additional nonlinear crystal is a frequency-doubling crystal.

12. The system of claim 1, wherein the non-linear crystal is a uniaxial crystal oriented with its optic axis coplanar with the zeroth-order and first-order beams, such that the zeroth-order and first-order beams are phase-matched to the same degree.

13. The system of claim 1, wherein the nonlinear crystal is oriented such that the zeroth-order and first-order beams are equally phase-matched in the nonlinear crystal.

14. A method for nonlinear frequency conversion, comprising steps of:
modulating an input laser beam with an acousto-optic modulator to diffract a portion of the input laser beam as a first-order beam and transmit a non-diffracted portion of the input laser beam as a zeroth-order beam;
controlling the acousto-optic modulator to transfer average power between the zeroth-order and first-order beams; and
frequency converting the zeroth-order and first-order beams in a nonlinear crystal to generate two respective frequency-converted laser beams, each of the zeroth-order and first-order beams being phase-matched to the respective frequency-converted laser beam.

15. The method of claim 14, wherein the controlling the acousto-optic modulator step causes the acousto-optic modulator to share average power between the zeroth-order and first-order beams, and wherein the method further comprises controlling a source of the input laser beam to set average power of the input laser beam to correct for effect of changed frequency-conversion efficiency on the heat load.

16. The method of claim 14, further comprising spatially overlapping the zeroth and first diffractive orders in the nonlinear crystal by at least 50 percent.

17. The method of claim 14, wherein the frequency converting step generates a harmonic of each of the zeroth-order and first-order beams, the frequency-converted laser beams being ultraviolet.

18. The method of claim 14, wherein the input laser beam has an average power of at least one kilowatt.

19. The method of claim 14, further comprising imaging the zeroth-order and first-order beams from the acousto-optic modulator to the nonlinear crystal.

20. The method of claim 19, wherein the imaging step includes increasing or decreasing diameter of the zeroth-order and first-order beams.

21. The method of claim 14, wherein, in the modulating step, the acousto-optic modulator outputs the zeroth-order and first-order beams with an angle of no more than 20 milliradians therebetween, the method further comprising maintaining the angle until the nonlinear crystal.

22. The method of claim 14, wherein the input laser beam is pulsed, and further comprising a step of delaying pulses of one but not both of the zeroth-order and first-order beams.

23. The method of claim 14, further comprising a step of generating the input laser beam, in an additional nonlinear crystal, as a harmonic of a precursor laser beam.

24. The method of claim 23, wherein:
the precursor laser beam is infrared;
the generating step generates the input laser beam by frequency doubling the precursor laser beam, the input laser beam being green; and
the frequency converting step generates the frequency-converted laser beams by frequency doubling each of the zeroth-order and first-order beams, the frequency-converted laser beams being ultraviolet.

25. The method of claim 14, further comprising a step of subjecting the zeroth-order and first-order beams to additional frequency conversion in an additional nonlinear crystal prior to the frequency converting step in the nonlinear crystal.

26. The method of claim 25, wherein:
the subjecting step generates a harmonic of each of the zeroth-order and first-order beams; and
the frequency-converting step generates the frequency-converted laser beams as a further harmonic of the harmonic of the zeroth-order and first-order beams, respectively.

27. The method of claim 25, wherein:
the subjecting step generates a second harmonic of each of the zeroth and first diffractive orders by frequency doubling each of the zeroth and first diffractive orders; and
the frequency-converting step generates each of the frequency-converted laser beams as a fourth harmonic of the input laser beam by frequency doubling the second harmonic of each of the zeroth-order and first-order beams.

* * * * *